US009088241B2

(12) United States Patent
Wu et al.

(10) Patent No.: US 9,088,241 B2
(45) Date of Patent: Jul. 21, 2015

(54) DRIVE SYSTEMS INCLUDING SLIDING MODE OBSERVERS AND METHODS OF CONTROLLING THE SAME

(75) Inventors: Long Wu, Fargo, ND (US); Yue Zhao, Lincoln, NE (US); Wei Qiao, Lincoln, NE (US)

(73) Assignees: DEERE & COMPANY, Moline, IL (US); THE BOARD OF REGENTS OF THE UNIVERSITY OF NEBRASKA, Lincoln, NE (US)

( * ) Notice: Subject to any disclaimer, the term of this patent is extended or adjusted under 35 U.S.C. 154(b) by 811 days.

(21) Appl. No.: 13/410,792

(22) Filed: Mar. 2, 2012

(65) Prior Publication Data

US 2013/0229135 A1 Sep. 5, 2013

(51) Int. Cl.
H02P 6/18 (2006.01)
H02P 21/13 (2006.01)

(52) U.S. Cl.
CPC ...................................... H02P 21/13 (2013.01)

(58) Field of Classification Search
CPC ............................. H02P 21/246; H02P 21/248
See application file for complete search history.

(56) References Cited

U.S. PATENT DOCUMENTS

2006/0097688 A1* 5/2006 Patel et al. .................... 318/778
2012/0249033 A1* 10/2012 Qin ........................... 318/400.32
2013/0175955 A1* 7/2013 Son et al. ................. 318/400.02

OTHER PUBLICATIONS

International Preliminary Report on Patentability dated Sep. 12, 2014.
M. Pacas, "Sensorless Drives in Industrial Applications," IEEE Industrial Electronics Magazine, vol. 5, pp. 16-23, Jun. 2011.
R. DeCarlo et al., "Variable structure control of nonlinear multivariable systems: A tutorial," Proc. IEEE, vol. 76, pp. 212-232, Mar. 1988.
V. Utkin, "Variable structure systems with sliding modes," IEEE Trans. Automatic Control, vol. 22, pp. 212-222, Apr. 1977.
V. Utkin et al., "Sliding Mode Control in Electromechanical Systems," $1^{st}$ Edition, New York, Taylro & Francis, pp. 206-211, 1999.
S. Chi et al., "Sliding-mode sensorless control of direct-drive PM synchronous motors for washing machine Applications," IEEE Trans. Industry Applications, vol. 45, pp. 582-590, Mar.-Apr. 2009.
Y. Zhang et al., "Sliding mode observers for electric machines—an overview," in Proc 2002 IEEE IAS Annual Meeting, pp. 1842-1847, 2004.

(Continued)

Primary Examiner — Shawki S Ismail
Assistant Examiner — Zoheb Imitiaz
(74) Attorney, Agent, or Firm — Harness, Dickey & Pierce, P.L.C.

(57) ABSTRACT

At least one example embodiment discloses a drive system including a motor including a rotor, the motor configured to receive a measured current, a controller configured to generate a voltage command for the motor, a sliding mode observer configured to determine an estimated current for the motor based on the voltage command, determine a difference between the measured current and the estimated current, and determine a switching control vector and an estimator configured to estimate a rotor position based on the switching control vector, the switching control vector being determined based on the difference and adaptive parameters of the sliding mode observer, the controller being further configured to control the motor based at least in part on the estimated rotor position.

22 Claims, 12 Drawing Sheets

(56) References Cited

OTHER PUBLICATIONS

S. Chi et al., "Position sensorless control of PMSM based on a novel sliding mode observer over wide speed range," in Proc. 2006 Power Electronics and Motion Control Conference, vol. 3, pp. 1-7, 2006.

M. Elbuluk et al., "Sliding mode observer for wide-speed sensorless control of PMSM drives," in Proc. 2003 IAS Annual Meeting, vol. 1, pp. 408-285, 2003.

G. Foo et al., "Sensorless sliding-mode MTPA control of an IPM synchronous motor drive using a sliding-mode observer and HF signal injection," IEEE Trans. Industrial Electronics, vol. 57, No. 4, pp. 1270-1278, Apr. 2010.

Z. Chen et al., "An extended electromotive force model for sensorless control of interior permanent-magnet synchronous motors," IEEE Trans. Industrial Electronics, vol. 50, pp. 288-295, Apr. 2003.

R. Hoseinnezhad et al., "A Novel Hybrid Angle Tracking Observer for Resolver to Digital Conversion," Decision and Control, 2005 and 2005 European Control Conference, CDC-ECC '05. 44$^{th}$ IEEE Conference on, pp. 7020-7025, 2005.

K. Bouallaga et al., "Demodulation methods on fully FPGA-based system for resolver signals treatment," Power Electronics and Applications, 2007 European Conference on, pp. 1-6, 2007.

Xu Yang et al., "Mechanical sensorless maximum power tracking control for direct-drive PMSG wind turbines," Energy Conversion Congress and Exposition (ECCE), 2010 IEEE, pp. 4091-4098, Sep. 12-16 2010.

Xiang Gong et al., "Wind Speed and Rotor Position Sensorless Control for Direct-Drive PMG Wind Turbines," Industry Applications Society Annual Meeting (IAS), 2010 IEEE, pp. 1-8, Oct. 3-7, 2010.

Wei Qiao et al., "Wind Speed and Rotor Position Sensorless Control for Direct-Drive PMG Wind Turbines," Industry Applications, IEEE Transactions on, vol. 48.,No. 1, pp. 3-11, Jan.-Feb. 2012.

International Search Report and Written Opinion dated Aug. 5, 2013.

Chi., S. et al., "Position-sensorless control of permanent magnet synchronous machines over wide speed range," Jan. 1, 2007, pp. 1-186.

Yu-zhou, L. et al., "Adaptive Back-stepping Control of Permanent Magnetic Synchronous Motor Based on Slide Mode Observer," 2011 Third International Conference on Measuring Technology and Mechatronics Automation, Jan. 6, 2011, pp. 326-330.

Tinga, S. et al., "Sensorless Control for Brushless DC Motors Using Adaptive Sliding Mode Observer," 29$^{th}$ Chinese Control Conference, Jul. 29, 2010, pp. 338-342.

\* cited by examiner

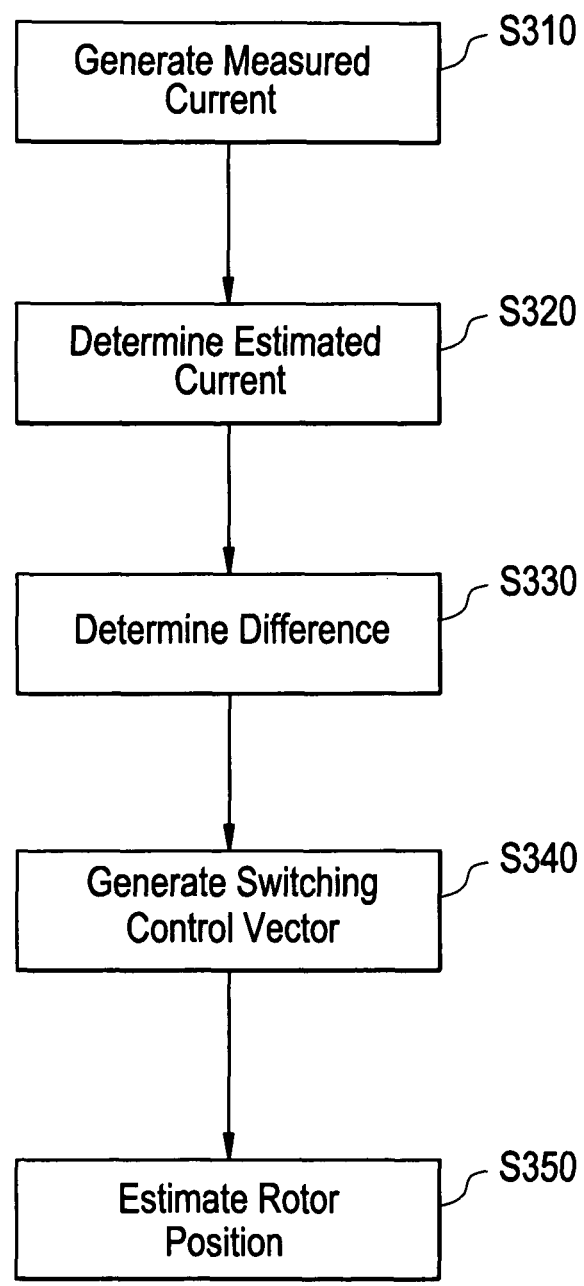

DRIVE SYSTEMS INCLUDING SLIDING MODE OBSERVERS AND METHODS OF CONTROLLING THE SAME

FIELD

Example embodiments are related to electric drive device systems and/or methods for controlling electric drive devices such as Interior Permanent Magnet (IPM) motors or machines.

BACKGROUND

IPM synchronous motors (IPMSMs) are used in hybrid and electric vehicle systems. Rotor position of the IPMSM is used for high-performance traction or voltage control of the IPMSM.

Electromechanical type of position sensors, e.g., resolvers, optical encoders, and hall-effect sensors, are used to obtain the rotor position and/or speed in IPMSM drive systems. The use of these electromechanical sensors increases cost, size, weight, and hardware wiring complexity of the IPMSM drive systems. Moreover, mounting electromechanical sensors on a rotor of the motor affects the robustness of the IPMSM. Sensors are often subject to failures in harsh environments, such as excessive ambient temperature, super high-speed operation, and other adverse or heavy load conditions.

As an alternative to sensors, sensorless drives including observers are used. One type of an art recognized observer is a sliding mode observer (SMO). A SMO is embodied in a specific purpose computer, mainly a microcontroller or digital signal processor specifically programmed to execute the SMO. In general, a SMO is an observer having inputs that are discontinuous functions of an error between estimated and measured outputs. In a SMO, a manifold is designed such that a system state trajectory exhibits a certain behavior when confined to the manifold. The manifold may also be referred to as a sliding surface.

SUMMARY

At least one example embodiment discloses an adaptive Quasi-SMO (QSMO) to estimate the rotor position from extended back electromagnetic force (EMF) quantities in an IPMSM. The QSMO parameters are adaptive to the load and rotor speed.

At least one example embodiment discloses an extended back EMF-based adaptive QSMO for rotor position estimation for a sensorless IPMSM drive. In the context of the present application, a sensorless system is a position/speed sensorless system, where position sensors may not be used to measure rotor position.

In the present application, state trajectory may refer to a difference between measured current and estimated current.

The inventors have discovered that a discrete-time sliding mode observer (DSMO) with conventional switching functions will keep tight regulation to force the state trajectory close to the sliding surface even when tracking error is within the width of the boundary layer. This could cause a chattering problem during a steady state. To mitigate this chattering problem and achieve a bounded motion within a limited boundary layer, a switching function may be implemented. The switching function leads to a quasi-sliding mode motion of the DSMO at steady state. Since the magnitude of the extended back EMF of the IPMSM changes with both load and speed variations, the parameters allow better performance than conventional SMOs.

At least another example embodiment discloses speed aided stabilizers to improve drive system stability and help the drive system go smoothly at load/speed transients. The inventors have discovered that commonly used methods to improve the stability are system state decoupling, which are used to disconnect direct input/output relationship between each sub-system. However, a second order IPMSM model is a simplified model and d-q axis equations are also coupling with each other. The inductances change with stator current and a gamma angle, and the stator resistance changes with temperature. These parameter variations are difficult to accurately model in a machine model. For other modules in a close-loop system, the inverter and SMO are nonlinear, and linearization methods as well as other approximation methods are needed. So the whole sensorless control system is a high order, nonlinear, coupling system with unmodeled parameters and model uncertainties. The transfer function and pole placement based decoupling methods are difficult for both analysis and implementation.

The speed aided stabilizers are based on the idea that motor rotor speed changes much slower than the position changes in medium and high speed ranges. Thus, during the time interval of consecutive two sampling points, speed can be assumed as a constant value, and can be used to predict the position for a next step. This predicted position for a next step can be used as a reference to adjust the estimated position, so as to help the system go through the transient with high accuracy.

At least one example embodiment discloses a drive system including a motor including a rotor, the motor configured to receive a measured current, a controller configured to generate a voltage command for the motor, a sliding mode observer configured to determine an estimated current for the motor based on the voltage command, determine a difference between the measured current and the estimated current, and determine a switching control vector and an estimator configured to estimate a rotor position based on the switching control vector, the switching control vector being determined based on the difference and adaptive parameters of the sliding mode observer, the controller being further configured to control the motor based at least in part on the estimated rotor position.

In one example embodiment, the sliding mode observer is configured to sample the measured current at a frequency of less than 10 kHz.

In one example embodiment, the sliding mode observer is configured to sample the measured current at approximately 6 kHz.

In one example embodiment, the sliding mode observer comprises the estimator.

In one example embodiment, the controller is configured to drive the motor between 500 revolutions per minute (RPM) and 5000 RPM.

In one example embodiment, the sliding mode observer is configured to determine the switching control vector by $$Z_{\alpha\beta} = \begin{cases} Z_0 & \varepsilon[k] > Z_0 \\ \varepsilon[k] & -Z_0 < \varepsilon[k] < Z_0 \\ -Z_0 & \varepsilon[k] < -Z_0 \end{cases}$$

wherein $Z_{\alpha\beta}$ is the switching control vector, $\epsilon[k]$ is the difference and $Z_0$ is one of the adaptive parameters.

In one example embodiment, $Z_0$ is $$Z_0 > \frac{2|\eta|}{2L_d f_s - R}$$

wherein $L_d$ is a direct axis inductance of the motor, $f_s$ is a sampling frequency, $\eta$ is a magnitude of extended back electromagnetic force (EMF) of the motor and R is a resistance of a stator of the motor.

In one example embodiment, $$Z_0 = \alpha \frac{2|\eta|}{2L_d f_s - R}$$

wherein $\alpha$ is between 1.1 and 1.2.

In one example embodiment, the sliding mode observer is configured to determine an extended back electromagnetic force (EMF) of the motor and $Z_o$ is proportional to a magnitude of the extended back EMF of the motor.

In one example embodiment, the sliding mode observer is configured to produce a gain and a product of the gain and $Z_o$ is larger than the magnitude of the extended back EMF of the motor.

In one example embodiment, the sliding mode observer is configured to receive a command speed for the motor and an associated torque percentage and the sliding mode observer includes a three-dimensional lookup table configured to determine $Z_0$ based on the command speed and the torque percentage.

In one example embodiment, the drive system further includes an inverter configured to supply a three-phase current to the motor based on pulse width modulation (PWM).

In one example embodiment, the sliding mode observer is configured to estimate a rotor position at a sampling frequency relatively greater than a PWM frequency.

In one example embodiment, the sliding mode observer is configured to estimate a rotor position at a sampling frequency double the PWM frequency.

In one example embodiment, the controller is configured to generate a voltage command and the sliding mode observer is configured to determine the estimated current based on the voltage command and the measured current.

At least one example embodiment discloses a method of estimating a rotor position in a motor. The method includes, obtaining a measured current for the motor, determining an estimated current using a sliding mode observer, determining a difference between the measured current and the estimated current, generating a switching control vector based on the difference and adaptive parameters of the sliding mode observer, and estimating the rotor position based on the switching control vector.

In one example embodiment, the method further includes sampling the measured current a frequency of less than 10 kHz, wherein the determining of a difference determines the difference based on the sampled current.

In one example embodiment, the sampling samples the measured current at approximately 6 kHz.

In one example embodiment, the method further includes driving the motor between 500 revolutions per minute (RPM) and 5000 RPM.

At least another example embodiment discloses a sliding mode observer configured to receive a measured current for a motor, determine an estimated current for a motor, determine a difference between the measured current and the estimated current, determine a switching control vector, and estimate a rotor position based on the switching control vector, the switching control vector being determined based on the difference and adaptive parameters of the sliding mode observer.

At least another example embodiment discloses a method of estimating a rotor position in a motor in a sensorless drive system. The method includes generating a measured current for the motor, determining an estimated current using a sliding mode observer, determining a difference between the measured current and the estimated current, generating a switching control vector based on the difference and adaptive parameters of the sliding mode observer, estimating the rotor position based on the switching control vector, and controlling the motor based on the estimating.

BRIEF DESCRIPTION OF THE DRAWINGS

Example embodiments will be more clearly understood from the following detailed description taken in conjunction with the accompanying drawings. FIGS. 1A-6 represent non-limiting, example embodiments as described herein.

FIG. 1A illustrates a drive system for controlling an IPM machine according to an example embodiment;

FIG. 3 illustrates a method of estimating a rotor position in a motor according to an example embodiment;

FIG. 5 illustrates a first method of stabilizing speed according to an example embodiment; and FIG. 6 illustrates a second method of stabilizing speed according to an example embodiment.

DETAILED DESCRIPTION

Figure 1A:
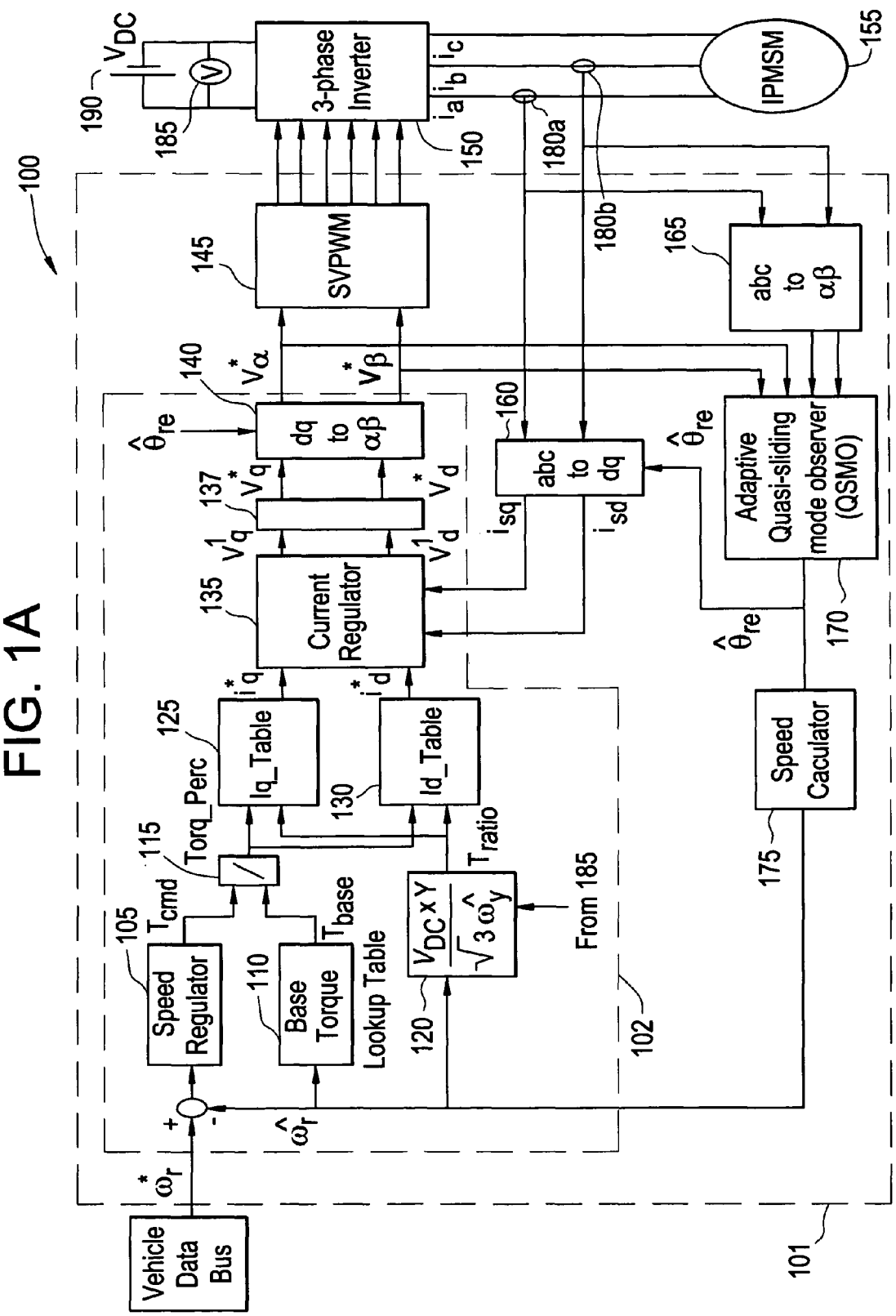

Various example embodiments will now be described more fully with reference to the accompanying drawings in which some example embodiments are illustrated.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of example embodiments and corresponding detailed description are presented in terms a processor specifically programmed to execute software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes including routines, programs, objects, components, data structures, etc., that perform particular tasks or implement particular abstract data types and may be implemented using existing hardware. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of example embodiments are typically encoded on some form of tangible (or recording) storage medium or implemented over some type of transmission medium. The tangible storage medium may be magnetic (e.g., a floppy disk or a hard drive) or optical (e.g., a compact disk read only memory, or "CD ROM"), and may be read only or random access.

In a discrete-time sliding mode controller (DSMC) or observer, to facilitate DSP or micro-controller based applications, controller inputs are calculated once per sampling period and held constant during this interval. The inventors have discovered that due to a finite sampling period or PWM switching frequency, the state trajectory is difficult to precisely move along the sliding surface, which will lead to a quasi-sliding mode motion only. For IPMSM drive applications, limitations in control loop frequency and CPU loading make it challenging to achieve high accuracy in position estimation. Moreover, a magnitude of extended back electromagnetic force (EMF) contains both a speed-related term and current-related terms, which means that both load and speed will affect the magnitude of the extended back EMF.

At least one example embodiment discloses an adaptive Quasi-SMO (QSMO) to estimate the rotor position from the extended back electromagnetic force (EMF) quantities in an IPMSM. The QSMO parameters are adaptive to the load and rotor speed.

FIGS. 1A-2D illustrate a drive system including a motor having a rotor, the motor configured to receive a measured current, a controller configured to generate a voltage command for the motor, a sliding mode observer configured to determine an estimated current for the motor based on the voltage command, determine a difference between the measured current and the estimated current, and determine a switching control vector and an estimator configured to estimate a rotor position based on the switching control vector, the switching control vector being determined based on the difference and adaptive parameters of the sliding mode observer. The controller is configured to control the motor based at least in part on the estimated rotor position In accordance with an example embodiment, FIG. 1A illustrates a drive system 100 for controlling an IPM machine such as a motor 155 (e.g., an interior permanent magnet synchronous motor (IPMSM)) or another alternating current machine. The drive system 100 may also be referred to as an IPMSM drive system.

It should be understood that the drive system 100 may include additional features that are not illustrated in FIG. 1A. For example, the drive system 100 may include a rotor magnet temperature estimation module, a current shaping module, and a terminal voltage feedback module. The features shown in FIG. 1A are illustrated for the convenience of describing the drive system 100 and it should be understood that the drive system 100 should not be limited to the features shown in FIG. 1A.

The system 100 includes electronic modules, software modules, or both. In an example embodiment, the drive system 100 includes an electronic data processing system 101 to support storing, processing or execution of software instructions of one or more software modules. The electronic data processing system 101 is indicated by the dashed lines in FIG. 1A and is shown in greater detail in FIG. 1B.

The data processing system 101 is coupled to an inverter circuit 150. The inverter circuit 150 may be a three-phase inverter. The inverter circuit 150 includes a semiconductor drive circuit that drives or controls switching semiconductors (e.g., insulated gate bipolar transistors (IGBT) or other power transistors) to output control signals for the motor 155. In turn, the inverter circuit 150 is coupled to the motor 155. The motor 155 is associated with sensors 180a and 180b.

Throughout the specification, the sensors 180a and 180b are referred to as current transducers. However, it should be understood that the sensors 180a and 180b may be another type of current sensor.

The current transducers 180a and 180b and the motor 155 are coupled to the data processing system 101 to provide feedback data (e.g., current feedback data, such as phase current values ia and ib), raw position signals, among other possible feedback data or signals, for example. While only two current transducers 180a and 180b are shown, it should be understood that the driver system 100 may implement three current transducers.

The data processing system 101 includes a software controller 102, converters 160, 165, a pulse width generation module 145, a QSMO 170 and a speed calculator 175.

The software controller 102, converters 160, 165, the pulse width generation module 145, the QSMO 170 and the speed calculator 175 are software modules. While the software controller 102, converters 160, 165, the pulse width generation module 145, the QSMO 170 and the speed calculator 175 are described as executing functions, it should be understood that a data processor, such as a digital signal processor or a microcontroller, is specifically programmed to execute the software controller 102, converters 160, 165, the pulse width generation module 145, the QSMO 170 and the speed calculator 175. For example, a data processor 264 is specifically programmed to execute the software controller 102, converters 160, 165, the pulse width generation module 145, the QSMO 170 and the speed calculator 175, as will be described in FIG. 1B.

The controller 102 includes a speed regulator 105, a base torque lookup table (LUT) 110, a torque processor 115, a ratio calculator 120, a q-axis current (iq) command LUT 125, a d-axis current (id) command LUT 130, a current regulator 135, a voltage compensator 137 and a converter 140.

In an example embodiment, a speed regulator 105 receives input data representing a difference between an estimated rotor speed $\hat{\omega}_r$ and a command rotor speed $\omega^*_r$ as input.

The command rotor speed $\omega^*_r$ may be input by a controller (shown as 266 in FIG. 1B) via a vehicle data bus 118. For example, if an operator wants the motor 155 to run at 5,000 RPM, the operator inputs 5,000 RPM into the controller and the vehicle data bus 118 inputs the command rotor speed $\omega^*_r$ to the controller 102. The speed regulator 105 converts the received input data into a torque command $T_{cmd}$.

While the term command is used throughout the specification, it should be understood that command refers to a target value.

The base torque LUT 110 determines a base torque value $T_{base}$ based on the estimated rotor speed $\hat{\omega}_r$.

From the estimated rotor speed $\hat{\omega}_r$, base torque values are respectively associated with discrete speed points with a nominal dc bus voltage level. In other words, the two-dimensional base torque LUT 110 is established from a motor characterization procedure. During the IPM motor characterization procedure, each rotor shaft speed has a maximum output torque, which is defined as the base torque at that speed. Thus, the base torque may also be referred to as peak torque.

The base torque LUT 110 outputs the associated base torque value as the base torque value $T_{base}$ to the torque processor 115.

The torque processor 115 receives the base torque value $T_{base}$ and the torque command $T_{cmd}$. The torque command $T_{cmd}$ may be in Nm.

The torque processor 115 is configured to determine an absolute value of the torque command $T_{cmd}$. The torque processor 115 is configured to convert the absolute value of the torque command $T_{cmd}$ into a percentage Torq_Perc of the base torque value $T_{base}$. The torque processor 115 outputs the percentage Torq_Perc to the q-axis current (iq) command LUT 125 and the d-axis current (id) command LUT 130.

In addition to sending the estimated rotor speed $\hat{\omega}_r$ to the base torque LUT 110, the speed calculator 175 sends the estimated rotor speed $\hat{\omega}_r$ to the ratio calculator 120.

In addition to receiving the estimated rotor speed $\hat{\omega}_r$, the ratio calculator 120 is configured to receive the measured operating dc bus voltage value. The measured operating dc bus voltage value is provided by a voltage sensor 185 which measures the DC bus in the inverter circuit 150. The inverter circuit 150 is powered by a direct current (dc) voltage bus. The ratio calculator 120 adjusts the operating DC bus voltage $V_{DC}$ by the voltage sensor 185 to the detected operating rotor shaft speed ratio as follows:

$$T_{ratio} = \frac{V_{DC} \times Y}{\sqrt{3}\,\hat{\omega}_r} \quad (1)$$

where $T_{ratio}$ is the adjusted detected operating DC bus voltage to the detected operating rotor shaft speed ratio and Y is a coefficient. For example, the coefficient Y may be 0.9. The ratio $T_{ratio}$ is output by the ratio calculator 120 to the d-q axis current command LUTs 125 and 130.

The q-axis current command (iq) LUT 125 and the d-axis current command (id) LUT 130 are configured to receive the ratio $T_{ratio}$. The q-axis current command LUT 125 and the d-axis current command LUT 130 store q-axis and d-axis current commands, respectively, each of which is associated with a pair of ratio and torque percentage values. The development of the q-axis current command LUT 125 and the d-axis current command LUT 130 may be done using any known method.

The d-q axis current refers to the direct axis current and the quadrature axis current as applicable in the context of vector-controlled alternating current machines, such as the motor 155.

The d-axis current command LUT 130 is configured to output a d-axis current command $i^*_d$ that is associated with the received torque percentage Torq_Perc and the ratio $T_{ratio}$. As shown in FIG. 1A, the d-axis current command $i^*_d$ is output to the current regulator 135.

The q-axis current command LUT 125 is configured to output a q-axis current command $i^*_q$ that is associated with the received torque percentage Torq_Perc and ratio $T_{ratio}$.

It should be understood that $i^*_d$ and $i^*_q$ are current commands for a stator of the motor 155.

While the q-axis current command LUT 125 and d-axis current command LUT 130 are illustrated and described as LUTs, it should be understood that the q-axis current command LUT 125 and d-axis current command LUT 130 may be implemented as a set of equations that relate respective torque commands to corresponding direct and quadrature axes currents, or a set of rules (e.g., if-then rules) that relates respective torque commands to corresponding direct and quadrature axes currents.

As shown in FIG. 1A, the q-axis current command $i^*_q$ is output to the current regulator 135.

The current regulator 135 is capable of communicating with the pulse-width modulation (PWM) generation module 145 (e.g., space vector PWM generation module). The current regulator 135 receives respective d-q axis current commands (e.g., $i^*_d$ and $i^*_q$) and measured d-q axis currents (e.g., $i_d$ and $i_s$) for the stator and outputs corresponding pre-compensated d-q axis voltage commands $v'_d$ and $v'_q$ to a voltage compensator 137.

The voltage compensator 137 provides voltage adjustment data to adjust the pre-compensated d-q axis voltage commands $v'_d$ and $v'_q$ and outputs d-q axis voltage commands $v^*_d$ and $v^*_q$. It should be understood that the voltage compensator 137 may generate the d-q axis voltage commands (e.g., $v^*_d$ and $v^*_q$ commands) using any known method such as current feed forward compensation.

The converter 140 receives the d-q axis voltage commands $v^*_d$ and $v^*_q$ and performs an inverse Park transformation to generate α-β axis voltage commands $v^*_\alpha$ and $v^*_\beta$. While at least one example embodiment is described using the α-β axis, it should be understood that example embodiments may be implemented using the d-q axis or three phase representation of a control vector.

In an example embodiment, the PWM generation module 145 converts the α axis voltage and β axis voltage data (voltage commands $v^*_\alpha$ and $v^*_\beta$) from two phase data representations into three phase representations (e.g., three phase voltage representations, such as va*, vb* and vc*) for control of the motor 155, for example. Outputs of the PWM generation module 145 are coupled to the inverter circuit 150.

The inverter circuit 150 includes power electronics, such as switching semiconductors to generate, modify and control pulse-width modulated signals or other alternating current signals (e.g., pulse, square wave, sinusoidal, or other waveforms) applied to the motor 155. The PWM generation module 145 provides inputs to a driver stage within the inverter circuit 150. An output stage of the inverter circuit 150 provides a pulse-width modulated voltage waveform or other voltage signal for control of the motor 155. In an example embodiment, the inverter 150 is powered by the direct current (dc) voltage bus voltage $V_{DC}$.

The current transducers 180a, 180b measure two of three phase current data ia and ib, respectively, applied to the motor 155. It should be understood that an additional current transducer may also measure a third phase current data ic.

The converter 160 may apply a Clarke transformation or other conversion equations (e.g., certain conversion equations that are suitable and are known to those of ordinary skill in the art) to convert the measured three-phase representations of current into two-phase representations of current based on the current data ia and ib from the current transducers 180a, 180b and an estimated rotor position $\hat{\theta}_{re}$ from the QSMO 170. The output of the converter 160 module ($i_d$, $i_q$) is coupled to the current regulator 135.

The converter 165 may apply a Park transformation or other conversion equations (e.g., certain conversion equations that are suitable and are known to those of ordinary skill in the art) to convert the measured three-phase representations of current into two-phase representations of current based on the current data ia and ib from the current transducers 180a, 180b. The output of the converter 160 module (measured currents $i_\alpha$, $i_\beta$) is coupled to the QSMO 170.

The QSMO 170 receives the measured currents $i_\alpha$, $i_\beta$ and the voltage commands $v^*_\alpha$ and $v^*_\beta$. Based on the measured currents $i_\alpha$, $i_\beta$ and the voltage commands $v^*_\alpha$ and $v^*_\beta$, the QSMO 170 is configured to output the estimated rotor position $\hat{\theta}_{re}$ to the speed calculator 175 and the converter 160, as will be described in greater detail in FIG. 2.

The speed calculator 175 may convert the estimated rotor position $\hat{\theta}_{re}$ provided by the QSMO 170 into the estimated rotor speed $\omega_r$.

Figure 1B:
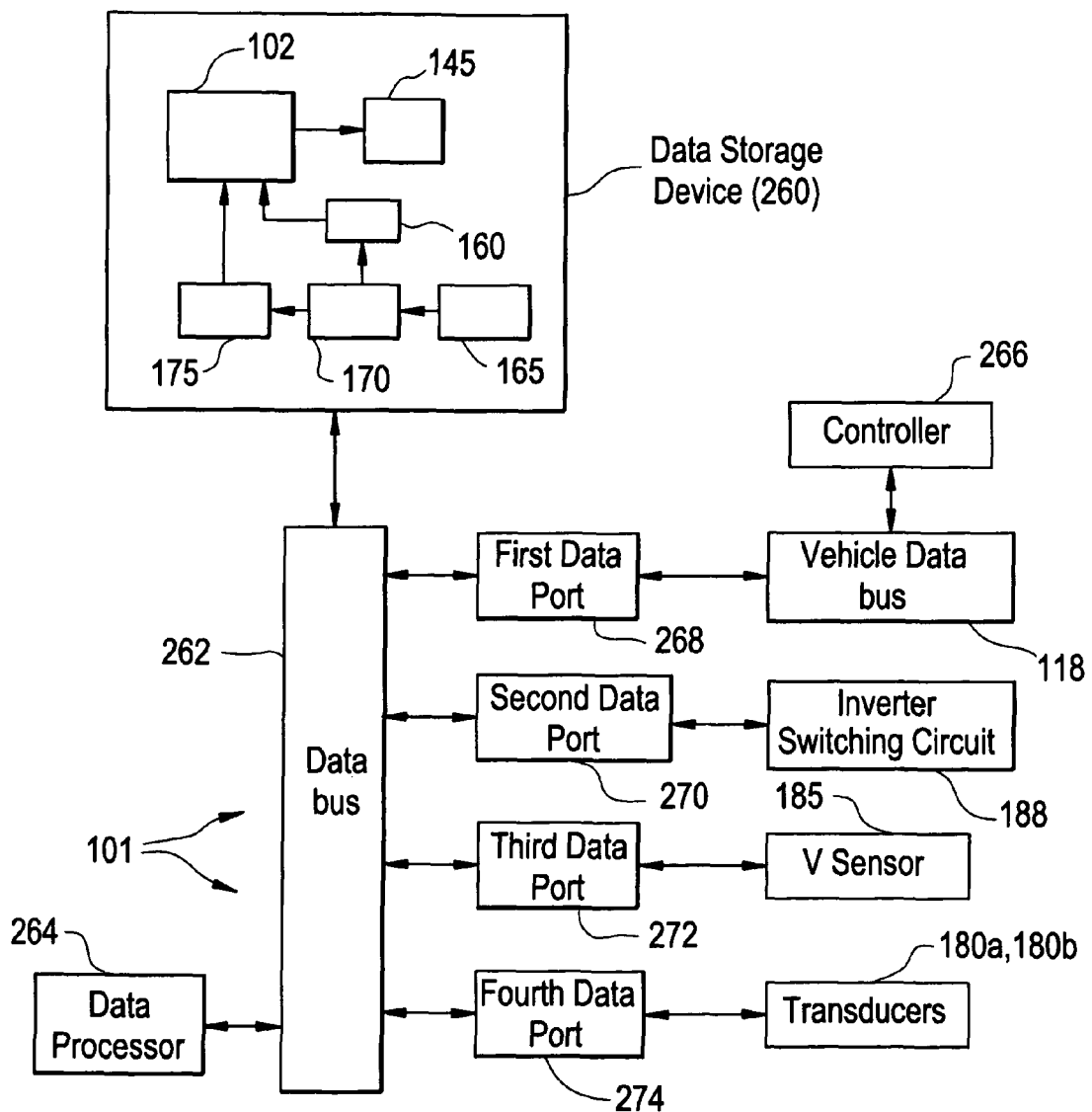
FIG. 1B illustrates a data processing system of the drive system of FIG. 1A according to an example embodiment.

In FIG. 1B, the electronic data processing system 101 includes an electronic data processor 264, a data bus 262, a data storage device 260, and one or more data ports (268, 270, 272 and 274). The data processor 264, the data storage device 260 and one or more data ports are coupled to the data bus 262 to support communications of data between or among the data processor 264, the data storage device 260 and one or more data ports.

In an example embodiment, the data processor 264 may include an electronic data processor, a digital signal processor, microprocessor, a microcontroller, a programmable logic array, a logic circuit, an arithmetic logic unit, an application specific integrated circuit, a digital signal processor, a proportional-integral-derivative (PID) controller, or another data processing device.

The data storage device 260 may include any magnetic, electronic, or optical device for storing data. For example, the data storage device 260 may include an electronic data storage device, an electronic memory, non-volatile electronic random access memory, one or more electronic data registers, data latches, a magnetic disc drive, a hard disc drive, an optical disc drive, or the like.

Moreover, in one example embodiment the data storage device 260 may store the controller 102, pulse width generation module 145, converters 160, 165, the QSMO 170 and the speed controller 175 to be used executed by the data processor 264. The data processor 264 may access the data storage device 260 and execute the controller 102, pulse width generation module 145, converters 160, 165, the QSMO 170 and the speed controller 175 via the data bus 262.

As shown in FIG. 1B, the data ports include a first data port 268, a second data port 270, a third data port 272 and a fourth data port 274, although any suitable number of data ports may be used. Each data port may include a transceiver and buffer memory, for example. In an example embodiment, each data port may include any serial or parallel input/output port.

In an example embodiment as illustrated in FIG. 1B, the first data port 268 is coupled to the vehicle data bus 118. In turn, the vehicle data bus 118 is coupled to a controller 266. In one configuration, the second data port 270 may be coupled to the inverter circuit 150; the third data port 272 may be coupled to the voltage sensor 185; and the fourth data port 274 may be coupled to the transducers 180a and 180b.

In an example embodiment of the data processing system 101, the speed regulator 105 is associated with or supported by the first data port 268 of the electronic data processing system 101. The first data port 268 may be coupled to a vehicle data bus 118, such as a controller area network (CAN)

data bus. The vehicle data bus 118 may provide data bus messages with torque commands to the speed regulator 105 via the first data port 268. The operator of a vehicle may generate the torque commands via a user interface, such as a throttle, a pedal, the controller 266, or other control device.

Figure 2A:
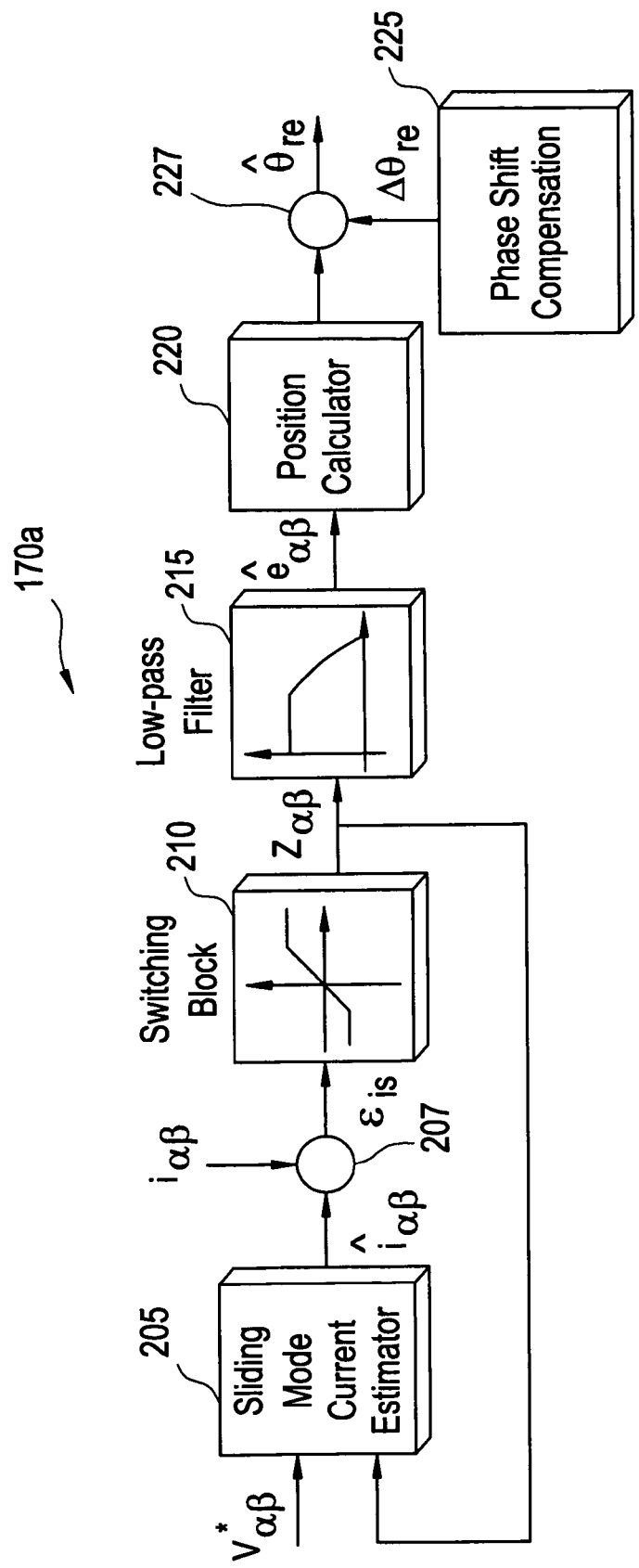
FIG. 2A illustrates an example embodiment of a QSMO shown in FIG. 1A.

FIG. 2A illustrates an example embodiment of the QSMO 170 shown in FIG. 1A. The QSMO 170 is configured to, receive a measured current for a motor, determine an estimated current for a motor, determine a difference between the measured current and the estimated current, determine a switching control vector, and estimate a rotor position based on the switching control vector, the switching control vector being determined based on the difference and adaptive parameters of the sliding mode observer.

The dynamics of the motor 155 can be modeled in the d-q rotating reference frame as:

$$\begin{bmatrix} v_d \\ v_q \end{bmatrix} = \begin{bmatrix} R+pL_d & -\omega_{re}L_q \\ \omega_{re}L_d & R+pL_q \end{bmatrix} \begin{bmatrix} i_d \\ i_q \end{bmatrix} + \begin{bmatrix} 0 \\ \omega_{re}\psi_m \end{bmatrix} \quad (2)$$

where p is the derivative operator, $v_{sd}$, $v_{sq}$, $i_{sd}$, and $i_{sq}$ are the stator voltages and currents, respectively, $\omega_{re}$ is the rotor electrical speed, and $\Psi_m$ is the magnetic flux linkage of the motor 155, $L_d$ and $L_q$ are the d-axis and q-axis inductances, respectively; and R is the stator resistance. As should be understood, $\omega_{re}$ is the rotor electrical speed and $\omega_r$ is the mechanical speed and $\omega_{re}$ is $\omega_r$ multiplied by the pole-pairs number.

Using the inverse Park transformation, the dynamic model of the motor 155 in the α-β stationary reference frame can be expressed as:

$$\begin{bmatrix} v_\alpha \\ v_\beta \end{bmatrix} = p \begin{bmatrix} L+\Delta L\cos(2\theta_{re}) & \Delta L\sin\theta_{re} \\ \Delta L\sin\theta_{re} & L-\Delta L\cos(2\theta_{re}) \end{bmatrix} \begin{bmatrix} i_\alpha \\ i_\beta \end{bmatrix} + R\begin{bmatrix} i_\alpha \\ i_\beta \end{bmatrix} + \omega_{re}\psi_m \begin{bmatrix} -\sin\theta_{re} \\ \cos\theta_{re} \end{bmatrix} \quad (3)$$

where $$L = \frac{L_d+L_q}{2}; \Delta L = \frac{L_d-L_q}{2};$$

and $\theta_{re}$ is the rotor position angle. While the electrical quantity $\theta_{re}$ is used described as the rotor position angle, it should be understood that a mechanical quantity may be used where the mechanical quantity is the electrical quantity $\theta_{re}$ divided by a number of magnetic pole pairs $p_o$ of the motor 155.

Due to the saliency of the motor (i.e., $L_d \neq L_q$), both the back EMF and the inductance matrix contain the information of the rotor position angle. Moreover, equation (3) contains both $2\theta_{re}$ and $\theta_{re}$ terms. To facilitate rotor position observation, an extended back EMF-based model for the motor 155 may be used as follows:

$$\begin{bmatrix} v_\alpha \\ v_\beta \end{bmatrix} = \begin{bmatrix} R+pL_d & \omega_{re}(L_d-L_q) \\ \omega_{re}(L_q-L_d) & R+pL_d \end{bmatrix}$$

$$\begin{bmatrix} i_\alpha \\ i_\beta \end{bmatrix} + [(L_d-L_q)(\omega_{re}i_d - pi_q) + \omega_{re}\psi_m] \begin{bmatrix} -\sin\theta_{re} \\ \cos\theta_{re} \end{bmatrix} \quad (4)$$

In equation (4) only the extended back EMF term contains the information of the rotor position. Thus, the rotor position can be extracted by an inverse tangent method or angle tracking observer using an estimated extended back EMF.

Back EMF is defined as:

$$\omega_{re}\psi_m \begin{bmatrix} -\sin\theta_{re} \\ \cos\theta_{re} \end{bmatrix}$$

Whereas extended back EMF may be defined as:

$$[(L_d-L_q)(\omega_{re}i_d - pi_q) + \omega_{re}\psi_m] \begin{bmatrix} -\sin\theta_{re} \\ \cos\theta_{re} \end{bmatrix}$$

A magnitude of the extended back EMF may be:

$$\eta = (L_d-L_q)(\omega_{re}i_d - pi_q) + \omega_{re}\Psi_m \quad (5)$$

The dynamic current equations of the motor 155 can be expressed in matrix form:

$$X = AX + BV + E \quad (6)$$

where $$V = [v_\alpha \ v_\beta]^T \quad (7)$$

$$E = \eta/L_d [\sin\theta_{re} - \cos\theta_{re}]^T = [E_\alpha \ E_\beta]^T \quad (8)$$

$$X = [i_\alpha \ i_\beta]^T \quad (9)$$

which is selected as the system state;

$$A = \begin{bmatrix} -R/L_d & \omega_{re} \ L_q - L_d/L_d \\ \omega_{re} \ L_d - L_q/L_d & -R/L_d \end{bmatrix} \quad (10)$$

and $$B = \begin{bmatrix} 1/L_d & 0 \\ 0 & 1/L_d \end{bmatrix} \quad (11)$$

Using the first-order Euler method, equation (6) may be written into a discrete-time model as follows:

$$\begin{cases} i_\alpha[k+1] = T_s\left(\frac{v_\alpha}{L_d} + \omega_{re}\frac{L_q-L_d}{L_d}i_\beta[k] + E_\alpha[k]\right) + \left(1 - \frac{T_sR}{L_d}\right)i_\alpha[k] \\ i_\beta[k+1] = T_s\left(\frac{v_\beta}{L_d} - \omega_{re}\frac{L_q-L_d}{L_d}i_\alpha[k] + E_\beta[k]\right) + \left(1 - \frac{T_sR}{L_d}\right)i_\beta[k] \end{cases} \quad (12)$$

wherein $T_s$ is the sampling period.

Referring back to FIG. 2A, a QSMO 170a includes a sliding mode current estimator 205, a switching block 210, a low-pass filter 215, a position calculator 220 and a phase shift compensator 225. The QSMO 170a may be executed by a digital signal processor or microcontroller. For example, the QSMO 170a may be software stored in a tangible computer readable medium and executed by the data processor 264.

The QSMO 170a receives the voltage commands $\upsilon_\alpha$ and $\upsilon_\beta$ and the measured currents $i_\alpha$ and $i_\beta$ converted from measured phase currents $i_a$, $i_b$ and $i_c$.

The sliding mode current estimator 205 receives the voltage commands $v^*_\alpha$ and $v^*_\beta$ and a switching control vector $Z_{\alpha\beta}$. It should be understood that terms having "$\alpha\beta$" as subscripts represent a vector having both the $\alpha$-axis term and the $\beta$-axis term. For example, voltage commands $v^*_\alpha$ and $v^*_\beta$ may be represented as $v^*_{\alpha\beta}$ such that $(\upsilon^*_{\alpha\beta})^T$ equals $[\upsilon^*_\alpha \ \upsilon^*_\beta]$.

Using equation (12), the sliding mode current estimator 205 samples the voltage commands $v^*_\alpha$ and $v^*_\beta$ and the switching control vector $Z_{\alpha\beta}$ and generates an estimated current value $\hat{i}_{\alpha\beta}$ ($\hat{i}_\alpha$ and $\hat{i}_\beta$) as follows:

$$\begin{cases} \hat{i}_\alpha[k+1] = T_s\left(\dfrac{v^*_\alpha}{L_d} + \omega_{re}\dfrac{L_q-L_d}{L_d}i_\beta[k] + lZ_\alpha[k]\right) + \left(1 - \dfrac{T_s R}{L_d}\right)\hat{i}_\alpha[k] \\ \hat{i}_\beta[k+1] = T_s\left(\dfrac{v^*_\beta}{L_d} - \omega_{re}\dfrac{L_q-L_d}{L_d}i_\alpha[k] - lZ_\beta[k]\right) + \left(1 - \dfrac{T_s R}{L_d}\right)\hat{i}_\beta[k] \end{cases} \quad (13)$$

As should be noted, equation (13) has the same form as equation (12). However, in equation (13), the voltage commands $\upsilon^*_\alpha$ and $\upsilon^*_\beta$ are used, which are received from the converter 140, so that the terminal voltage does not need to be measured. However, if a dead-time effect is not fully compensated for, the voltage command will not equal the terminal voltage. This voltage mismatch will bring some error to the estimated position.

A comparator 207 receives the measured currents $i_\alpha$ and $i_\beta$ and the estimated currents $\hat{i}_\alpha$ and $\hat{i}_\beta$. The comparator 207 determines errors $\epsilon_\alpha$ and $\epsilon_\beta$ between the measured currents $i_\alpha$ and $i_\beta$ and the estimated currents $\hat{i}_\alpha$ and $\hat{i}_\beta$, respectively. The errors $\epsilon_\alpha$ and $\epsilon_\beta$ may be differences between the measured currents $i_\alpha$ and $i_\beta$ and the estimated currents $\hat{i}_\alpha$ and $\hat{i}_\beta$, respectively.

The comparator 207 sends the errors $\epsilon_\alpha$ and $\epsilon_\beta$ to the switching block 210. Based on the errors $\epsilon_\alpha$ and $\epsilon_\beta$, the switching block 210 determines the switching control vector $Z_{\alpha\beta}$. The switching control vector $Z_{\alpha\beta}$ contains the information of back EMF. Since the switching control vector $Z_{\alpha\beta}$ is the output of switching block 210, it contains heavy switching noise. The low-pass filter 215 receives the switching control vector $Z_{\alpha\beta}$ to smooth the estimated back EMF profile. The low-pass filter 215 adds a phase delay to original signal input. The phase shift compensator 225 compensates for the phase delay.

Thus, a tracking error between the measured current and estimated current is:

$$\epsilon[k]^T = [I_\alpha[k] - \hat{I}_\alpha[k] \ \ I_\beta[k] - \hat{I}_\beta[k]] \quad (14)$$

More specifically, equation (15) can be obtained by subtracting (13) from (12):

$$\begin{cases} \varepsilon_\alpha[k+1] = \left(1 - \dfrac{T_s R}{L_d}\right)\varepsilon_\alpha[k] + T_s E_\alpha[k] - T_s lZ_\alpha \\ \varepsilon_\beta[k+1] = \left(1 - \dfrac{T_s R}{L_d}\right)\varepsilon_\beta[k] + T_s E_\beta[k] - T_s lZ_\beta \end{cases} \quad (15)$$

The QSMO 170a has a sliding surface s[k], which is designed to equal the tracking error $\epsilon[k]$ and 0.

The switching block 210 implements a variable switching function as follows:

$$Z_{\alpha\beta} = \begin{cases} Z_0 & \varepsilon[k] > Z_0 \\ \varepsilon[k] & -Z_0 < \varepsilon[k] < Z_0 \\ -Z_0 & \varepsilon[k] < -Z_0 \end{cases} \quad (16)$$

where $Z_0$ is an adaptive parameter. A boundary layer is formed between $-Z_0$ and $Z_0$.

Figure 2B:
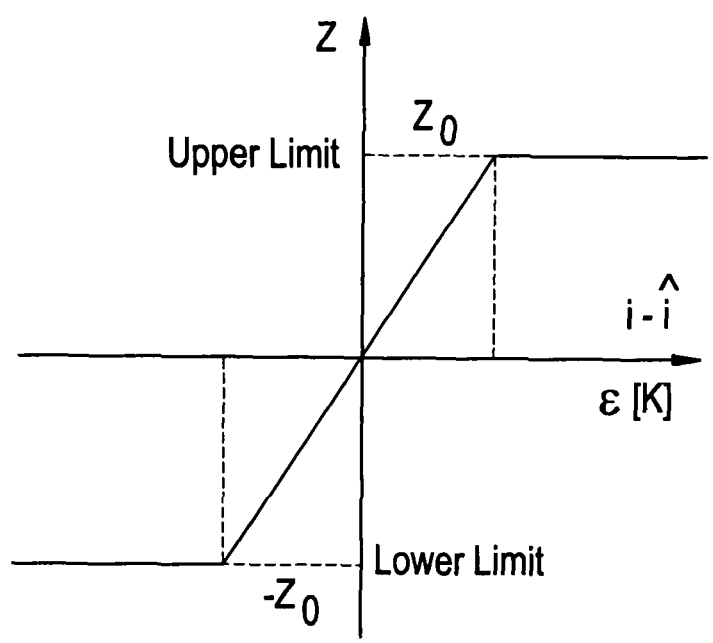
FIG. 2B illustrates an example embodiment of a variable switching function implemented by a switching block according to an example embodiment.

FIG. 2B illustrates an example embodiment of the variable switching function implemented by the switching block 210. As shown in FIG. 2B, if the tracking error $\epsilon[k]$ is larger than the adaptive parameter $Z_0$, the switching block 210 outputs $Z_0$ as the switching control vector $Z_{\alpha\beta}$. If the tracking error $\epsilon[k]$ is smaller than $-Z_0$, the switching block 210 outputs $-Z_0$ as the switching control vector $Z_{\alpha\beta}$. If the tracking error $\epsilon[k]$ is between $-Z_0$ and $Z_0$, the output of switching function will be the tracking error $\epsilon[k]$. In this case, the tracking error $\epsilon[k]$ is the switching control vector $Z_{\alpha\beta}$. The switching block 210 outputs the switching control vector $Z_{\alpha\beta}$ to the sliding mode current estimator 205 and the low-pass filter 215.

If the reaching condition can be satisfied, the state trajectory will approach the sliding surface. When the tracking error $\epsilon[k]$ is limited within a boundary layer (e.g., between $-Z_0$ and $Z_0$), the output of the switching block 210 is equal to the extended back EMF with heavy noise. In other words, $Z_{\alpha\beta}$ equals the extended back EMF with high order harmonics. The determination of the adaptive parameter $Z_0$ is described in greater detail below.

It should be understood that the variable switching function may be implemented as hardware or software used with an associated processor to execute the switching function.

The low-pass filter 215 receives the switching control vector $Z_{\alpha\beta}$ from the switching block 210 and filters the switching control vector $Z_{\alpha\beta}$ to remove noise. The low-pass filter 215 may be a second order low pass Butterworth filter generated in the S-plane, for example.

The low-pass filter 215 outputs the filtered switching control vector $Z_{\alpha\beta}$ as an estimated back EMF $\hat{e}_{\alpha\beta}$ to the position calculator 220. The output of the low-pass filter 215 has a same magnitude as the extended back EMF, however, the output of the low-pass filter 215 has a phase difference with respect to the extended back EMF.

The position calculator 220 determines a rotor position of the motor 155 based on the estimated back EMF $\hat{e}_{\alpha\beta}$. The rotor position determined by the position calculator 220 is not compensated for the phase shift caused by the low-pass filter 215. Therefore, the phase shift compensator 225 adds a phase shift $\Delta\beta_{re}$ to the rotor position at a logic unit 227 to compensate for the phase shift. More specifically, the phase shift compensator 225 compensates for the phase difference caused by the low-pass filter 215 using the phase-frequency characteristic of the low-pass filter 215 determined by the phase shift compensator 225.

The QSMO 170 sums the output from the position calculator 220 and the phase shift $\Delta\theta_{re}$ to produce the estimated rotor position $\hat{\theta}_{re}$.

The position calculator 220 and the phase shift compensator 225 may be referred to as an estimator configured to estimate a position of the rotor based on the switching control vector. As described above, the switching control vector is determined by the QSMO 170a based on the difference between differences between the measured currents $i_\alpha$ and $i_\beta$ and the estimated currents $\hat{i}_\alpha$ and $\hat{i}_\beta$, respectively, and the adaptive parameters $Z_0$ and l.

Determination of the Adaptive Parameters

The QSMO 170a is configured to determine adaptive parameters $Z_0$ and l.

Equation (15) depicts dynamics of the state trajectory (difference between the measured current and the estimated current) of the QSMO 170. In order to ensure the state trajectory can move from an initial point to the sliding surface after a finite time step, the dynamic of state trajectory has a convergent behavior. Thus, the adaptive parameter $Z_0$ and an adaptive parameter l satisfy this convergent condition. The adaptive parameter l is the gain of the QSMO 170.

Alpha axis and beta axis equations have an identical structure in equation (15). Thus, if the convergence can be proved for the equation in alpha axis, the equation in beta axis can be identically proved. In one example embodiment, the following procedures are implemented by the QSMO 170:

(i) The state trajectory moves in the direction of the sliding surface when the error is outside the width of the boundary layer ($|\epsilon[k]|$ is greater than $Z_0$). Consequently, when the tracking error $\epsilon[k]$ is greater than the adaptive parameter $Z_0$, the tracking error $\epsilon[k+1]$ is less than the tracking error $\epsilon[k]$; while when the tracking error $\epsilon[k]$ is less than $-Z_0$, the tracking error $\epsilon[k+1]$ is greater than the tracking error $\epsilon[k]$.

(ii) In order to reduce the state trajectory change between the $k^{th}$ and $(k+1)^{th}$ samples, the tracking error $\epsilon[k]$ is greater than $Z_0$ when the tracking error $\epsilon[k+1]$ plus the tracking error $\epsilon[k]$ is greater than 0; and when the tracking error $\epsilon[k]$ is less than $-Z_0$ when the tracking error $\epsilon[k+1]$ plus the tracking error $\epsilon[k]$ is less than zero 0.

Condition (i) controls the direction of the state trajectory (error goes up then goes down) and condition (ii) controls the amount of change between two consecutive samples. Hence, when both conditions (i) and (ii) are implemented, the state trajectory can move from an initial condition to the sliding surface and remains in the boundary layer (between $-Z_0$ and $Z_0$).

For example, in condition (i), if the tracking error $\epsilon_a[k]$ is greater than the adaptive parameter $Z_0$, such that $Z_a$ equals the adaptive parameter $Z_0$, the tracking error $\epsilon_a[k+1]$ would be less than the tracking error $\epsilon_a[k]$, which can be formulated based on equation (15) as:

$$\varepsilon_a[k+1] - \varepsilon_a[k] = -\frac{T_s R}{L_d}\varepsilon_a[k] + T_s E_a[k] - T_s l Z_0 < 0 \tag{17}$$

which can also be formulated as:

$$lZ_0 > -\frac{R}{L_d}\varepsilon_a[k] + E_a[k] \tag{18}$$

because the adaptive parameter $Z_0$ is less than the tracking error $\epsilon_a[k]$ and greater than 0, and $$-\frac{R}{L_d}Z_0 > -\frac{R}{L_d}\varepsilon_a[k].$$

If the following inequality is satisfied, equations (17) and (18) are satisfied:

$$\left(l + \frac{R}{L_d}\right)Z_0 > E_a[k] \tag{19}$$

Because $R/L_d$ is positive, a stronger condition can be obtained as $lZ_0$ is greater than the amplitude $E_a[k]$, which means if $lZ_0$ is greater than the magnitude of the extended back EMF η, the tracking error $\epsilon_a[k+1]$ being greater than the tracking error $\epsilon_a[k]$ can be satisfied when the tracking error $\epsilon_a[k]$ is greater than adaptive parameter $Z_0$.

If the tracking error $\epsilon_a[k]$ is less than $-Z_0$, such that $Z_a$ equals $-Z_0$, the tracking error $\epsilon_a[k+1]$ would be greater than the tracking error $\epsilon_a[k]$, which can be formulated based on equation (15) as:

$$\varepsilon_a[k+1] - \varepsilon_a[k] = -\frac{T_s R}{L_d}\varepsilon_a[k] + T_s E_a[k] + T_s l Z_0 > 0 \tag{20}$$

and can also be formulated as:

$$lZ_0 > \frac{R}{L_d}\varepsilon_a[k] - E_a[k] \tag{21}$$

because the tracking error $\epsilon_a[k]$ is greater than $-Z_0$ and less than 0, $$-\frac{R}{L_d}Z_0 > \frac{R}{L_d}\varepsilon_a[k].$$

If the following inequality is satisfied, equations (20) and (21) are satisfied:

$$\left(l + \frac{R}{L_d}\right)Z_0 > -E_a[k] \tag{22}$$

Since $R/L_d$ is positive, a stronger condition can also be proposed as $lZ_0$ is greater than $-E_a[k]$, which means if $lZ_0$ is greater than the an amplitude of the back EMF $E_a[k]$, the tracking error $\epsilon_a[k+1]$ is greater than the tracking error $\epsilon_a[k]$ can be satisfied when the tracking error $\epsilon_a[k]$ is less than $-Z_0$.

Thus, if the product of the QSMO gain l and the adaptive parameter $Z_0$ is greater than the magnitude of the extended back EMF η, condition (i) is satisfied. When the tracking error $\epsilon_a[k]$ is outside the width of the boundary layer, the state trajectory will move in the direction of the sliding surface.

In condition (ii), if the tracking error $\epsilon_a[k]$ is greater than the adaptive parameter $Z_0$, such that $Z_a$ equals $Z_0$, the sum of tracking errors $\epsilon[k+1]+\epsilon[k]$ is greater than 0, which can be formulated based on equation (15) as:

$$\varepsilon_a[k+1] + \varepsilon_a[k] = \left(2 - \frac{T_s R}{L_d}\right)\varepsilon_a[k] + T_s E_a[k] - T_s l Z_0 > 0 \tag{23}$$

and can also be formulated as:

$$lZ_0 < \left(\frac{2}{T_s} - \frac{R}{L_d}\right)\varepsilon_a[k] + E_a[k] \tag{24}$$

because the tracking error $\epsilon_a[k]$ is greater than the adaptive parameter $Z_0$ and 0, $$\left(\frac{2}{T_s} - \frac{R}{L_d}\right)Z_0 < \left(\frac{2}{T_s} - \frac{R}{L_d}\right)\varepsilon_\alpha[k].$$

If the following inequality is satisfied, equations (23) and (24) are satisfied:

$$lZ_0 < \left(\frac{2}{T_s} - \frac{R}{L_d}\right)Z_0 + E_\alpha[k] \quad (25)$$

If the tracking error $\epsilon_\alpha[k]$ is less than $-Z_0$, such that $Z_a=-Z_0$, the sum tracking errors $\epsilon[k+1]$ and $\epsilon[k]$ is less than 0, which can be formulated based on equation (15) as:

$$\varepsilon_\alpha[k+1] + \varepsilon_\alpha[k] = \left(2 - \frac{T_s R}{L_d}\right)\varepsilon_\alpha[k] + T_s E_\alpha[k] + T_s lZ_0 < 0 \quad (26)$$

and can also be formulated as:

$$lZ_0 < -\left(\frac{2}{T_s} - \frac{R}{L_d}\right)\varepsilon_\alpha[k] - E_\alpha[k] \quad (27)$$

because the tracking error $\epsilon_\alpha[k]$ is less than $-Z_0 < 0$, $$\left(\frac{2}{T_s} - \frac{R}{L_d}\right)Z_0 < -\left(\frac{2}{T_s} - \frac{R}{L_d}\right)\varepsilon_\alpha[k].$$

If the following inequality is satisfied, equations (26) and (27) are satisfied:

$$lZ_0 < \left(\frac{2}{T_s} - \frac{R}{L_d}\right)Z_0 - E_\alpha[k] \quad (28)$$

If $lZ_0$ is smaller than $$\left(\frac{2}{T_s} - \frac{R}{L_d}\right)Z_0 - |E_\alpha[k]|,$$

where $|E_\alpha[k]|$ is the amplitude of the extended back EMF $\eta$, the condition (ii) is satisfied and the change in the state trajectory between the $k^{th}$ and $(k+1)^{th}$ samples will also be limited.

The amplitude of the extended back EMF $|E_\alpha[k]|$ may be related to the magnitude of the EMF $\eta$ as follows:

$$|E_\alpha[k]| = \eta * \sin\theta|$$

Condition (i) provides a lower boundary for the product of the gain l and the adaptive parameter $Z_0$; while condition (ii) provides an upper boundary for the product of the gain l and the adaptive parameter $Z_0$. In one example embodiment, the upper boundary is larger than the lower boundary, which can be formulated as:

$$Z_0 > \frac{2T_s L_d |E_\alpha[k]|}{2L_d - RT_s} = \frac{2|\eta|}{2L_d f_s - R} \quad (29)$$

where $f_s$ is the sampling frequency. According to the discussion above, in order to converge the state trajectory to the sliding surface s[k] from the initial state after finite time steps, the adaptive parameters $Z_0$ and l of the switching function satisfy the following:

$$\begin{cases} |E_\alpha[k]| < lZ_0 < \left(\frac{2}{T_s} - \frac{R}{L_d}\right)Z_0 - |E_\alpha k| \\ Z_0 > \frac{2|\eta|}{2L_d f_s - R} \end{cases} \quad (30)$$

In one example embodiment, based on equation (30), $lZ_0$ is a bounded value and is larger than the magnitude of the back EMF $\eta$ in the current time sample k. When the speed $\omega_r$ increases, the magnitude of the back EMF will also increase.

The adaptive parameter $Z_0$ is proportional to the magnitude of the estimated back EMF $\hat{e}_{\alpha\beta}$. For example, when the magnitude of the estimated back EMF $\hat{e}_{\alpha\beta}$ increases, the change in the back EMF between two consecutive samples will also increase; as a consequence, if the sampling frequency $f_s$ remains the same, the tracking error $\epsilon[k]$ will increase.

If the sampling frequency $f_s$ increases, the sampling time $T_s$ will decrease, and the minimum value of the adaptive parameter $Z_0$ will also decrease, which indicates that increasing the sampling frequency $f_s$ will maintain the state trajectory in a smaller boundary layer and improve the tracking performance.

Figure 2C:
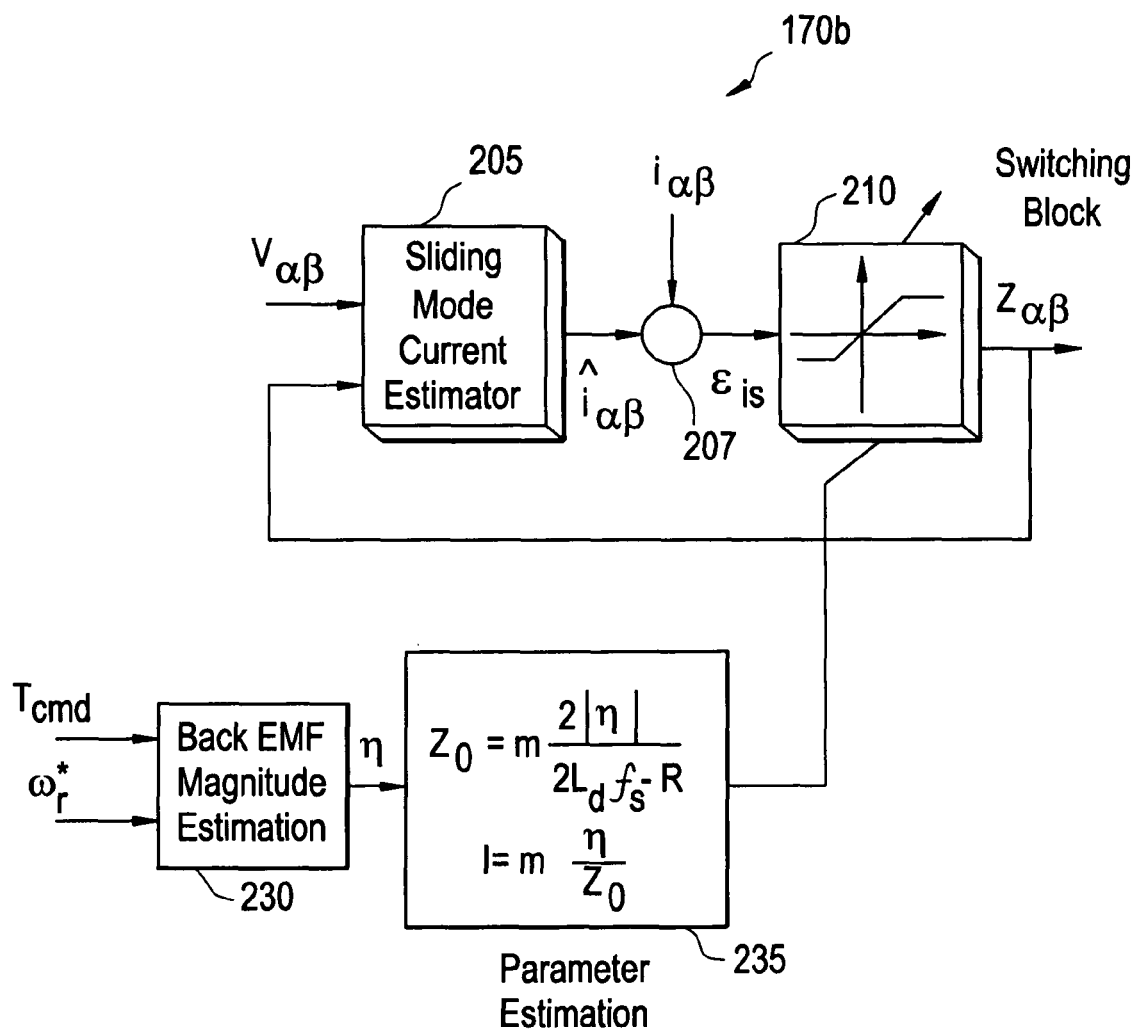
FIG. 2C illustrates an example embodiment of a portion of the QSMO shown in FIG. 1A.

FIG. 2C illustrates an example embodiment of a portion of the QSMO 170 shown in FIG. 1A. As shown in FIG. 2C, a portion 170b includes the switching block 210 and sliding mode current estimator 205. It should be understood, that the QSMO 170a, shown in FIG. 2A, may include the portion 170b, and the portion 170b is illustrated to show an example embodiment of how the adaptive parameters $Z_0$ and l may be determined by the QSMO 170.

As shown in FIG. 2C, a back EMF magnitude estimator 230 estimates the magnitude of back EMF $\eta$ using equation (5).

Based on the magnitude of back EMF $\eta$, a parameter estimator 235 calculates the adaptive parameters $Z_0$ and l as follows:

$$Z_0 = m\frac{2|\eta|}{2L_d f_s - R} \quad (31)$$

$$l = m\frac{n}{Z_0} \quad (32)$$

where m is a parameter used to satisfy equation (30), and can be between 1-1.6, and preferably 1.1~1.2, which means 10%~20% larger than the minimum value of $Z_0$. The parameter m is a testing-tuned coefficient to provide margin for the adaptive parameters $Z_0$ and l.

Equation (5) indicates that the magnitude of the extended back EMF $\eta$ is a function of the currents $i_d$ and $i_q$ as well as the rotor speed $\omega_r$. In steady state $di_q/dt$ can be assumed 0. Thus, if the current $i_d$ and the speed $\omega_r$ are known, the value of $\eta$ can be determined.

The back EMF magnitude estimator 230 determines the current $i_d$ from the torque command $T_{cmd}$. For an IPMSM such as the motor 155, a generated electromagnetic torque $T_e$ can be expressed as:

$$T_e = 3/2 p_o i_q [(L_d - L_q) i_d + \Psi_m] \qquad (33)$$

where $p_o$ is the number of magnetic pole pairs of the motor 155. The relationship between $i_d$ and $i_q$ depends on the control algorithm used for the motor 155. For example, if a maximum torque per ampere (MTPA) control is used, the relationship between $i_d$ and $i_q$ can be obtained by taking Taylor's series expansion as follows:

$$i_d^* = \frac{(L_d - L_q)}{\psi_m} i_q^2 \qquad (34)$$

Therefore, once the back EMF magnitude estimator 230 receives the torque command $T_{cmd}$ and the estimated speed $\hat{\omega}^*_r$, the back EMF magnitude estimator 230 can determine the values of $i_d$ and $i_q$ using equations (33) and (34). The relationship between the command torque $T_{cmd}$ and currents $i_d$ and $i_q$ can be implemented by using a look-up table or a high-order polynomial.

The back EMF magnitude estimator 230 and the parameter estimator 235 may be software executed by digital signal processor or microcontroller, for example, to implement the EMF estimations and parameter estimations. The back EMF magnitude estimator 230 and the parameter estimator 235 may be executed by the data processor 264.

Figure 2D:
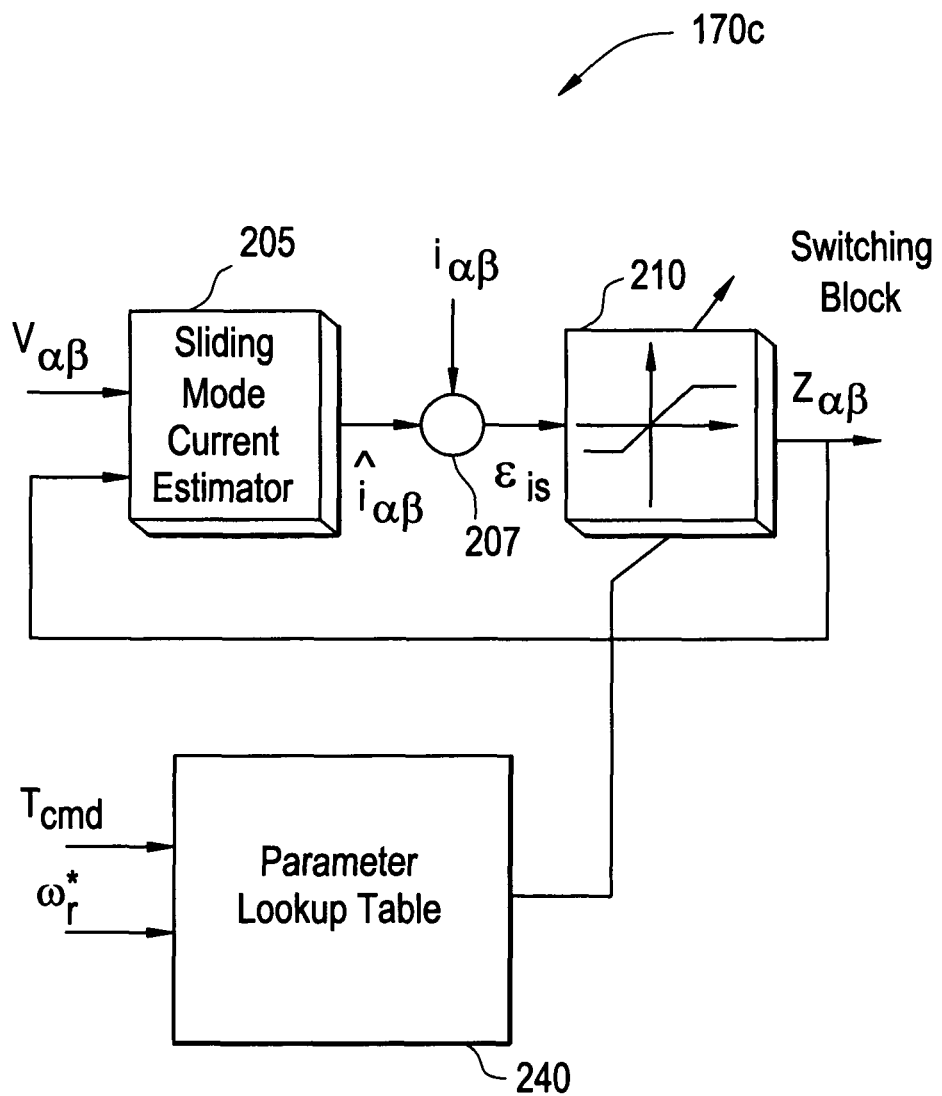
FIG. 2D illustrates an example embodiment of a portion of the QSMO shown in FIG. 1A.

FIG. 2D illustrates an example embodiment of a portion of the QSMO 170 shown in FIG. 1A. As shown in FIG. 2D, a portion 170c includes the switching block 210 and sliding mode current estimator 205. It should be understood, that the QSMO 170a, shown in FIG. 2A may include the portion 170c and the portion 170c is illustrated to show an example embodiment of how the adaptive parameters $Z_0$ and $l$ may be determined by the QSMO 170.

The portion 170c is the same as the portion 170b except the portion 170c includes a parameter LUT 240 instead of the back EMF magnitude estimator 230 and the parameter estimator 235. The parameter LUT 240 receives the torque command $T_{cmd}$ and speed command $\omega^*_r$. The parameter LUT 240 is a 3-D lookup table. Based on equation (30), the parameter LUT 240 generates the adaptive parameters $Z_0$ and $l$ as follows:

$$Z_0 = m \frac{2|\eta|}{2 L_d f_s - R} \qquad (35)$$

$$l = m \frac{|\eta|}{Z_0} \qquad (36)$$

In an example of the parameter LUT 240, the product of QSMO gain $l$ and adaptive parameter $Z_0$ are determined based on machine speed and torque command. For example, for a constant sampling frequency, the QSMO gain $l$ is a constant value, e.g., 8000, for 5000Hz sampling frequency.

Figure 2E:
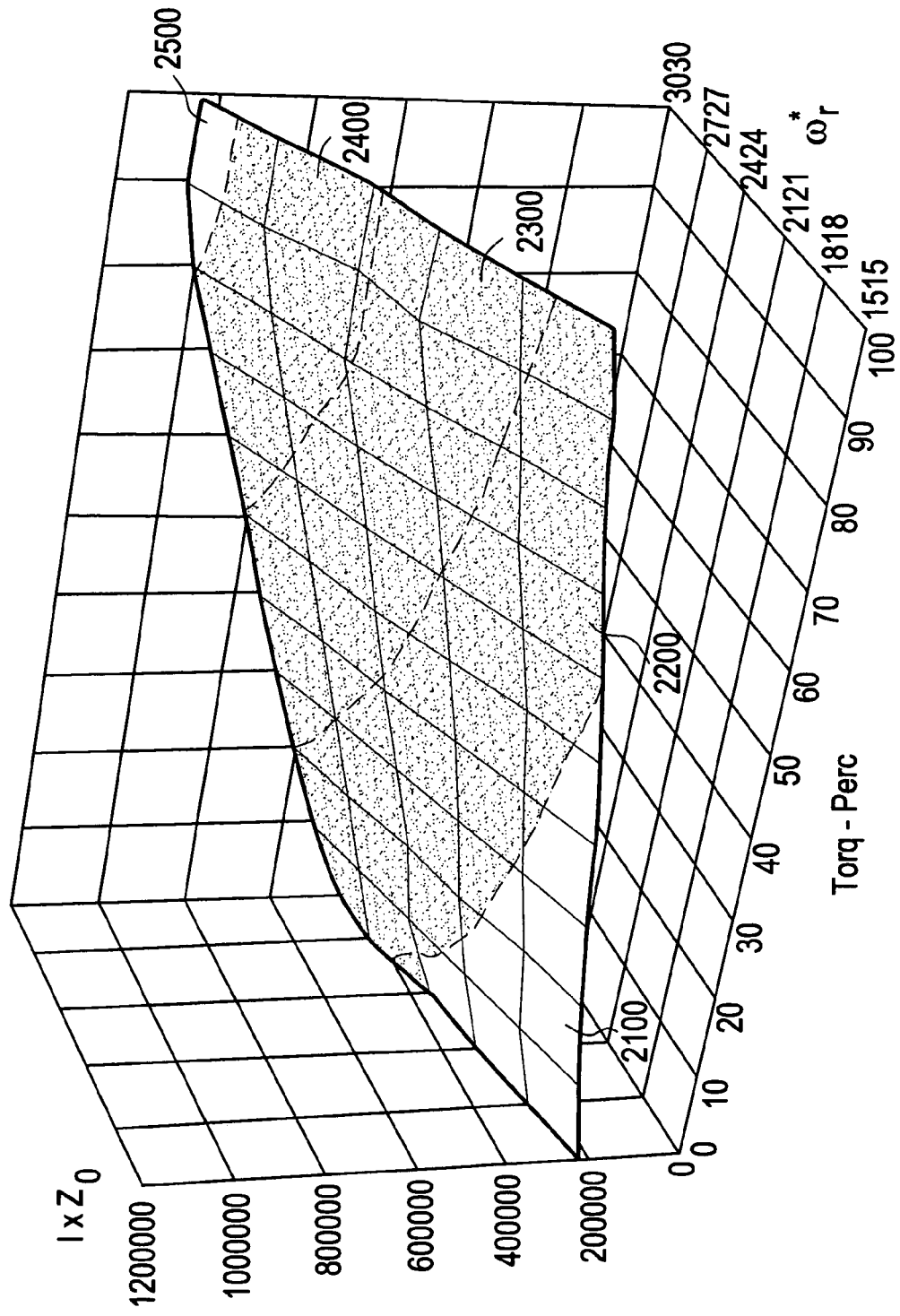
FIG. 2E illustrates an example embodiment of a parameter lookup table.

FIG. 2E illustrates an example embodiment of the parameter LUT 240. FIG. 2E illustrates a 3-D lookup table. Based on the torque percentage Torq_Perc and the speed command $\omega^*_r$, the parameter LUT 240 may determine the product of QSMO gain $l$ and adaptive parameter $Z_0$. In FIG. 2E, portion 2100 represents a product between 200,000 and 400,000, portion 2200 represents a product between 400,000 and 600,000, portion 2300 represents a product between 600,000 and 800,000, portion 2400 represents a product between 800,000 and 1,000,000 and portion 2500 represents a product between 1,000,000 and 1,200,000.

By using the lookup table shown in FIG. 2E or the portion in FIG. 2C, the observer parameters ($Z_0$ and $l$) are selected according to the command torque and speed, to manage both load/speed variation and machine parameter variation from given values provided by a machine manufacturer. The QSMO 170 achieves accurate position estimation without phase shift.

While FIGS. 2C-2D illustrate the back EMF estimator 230 as configured to receive the torque command $T_{cmd}$ and the command speed $\omega^*_r$, the percentage Torq_Perc may be directly used from the torque processor 115 instead of the torque command $T_{cmd}$ and the command speed $\omega^*_r$.

Double Sampling Frequency

In one example embodiment, the QSMO 170 is configured to sample the voltage command $v^*_{\alpha\beta}$ and the measured current $i_{\alpha\beta}$ at twice a frequency as the PWM frequency of the pulse width generation module 145.

For example, a PWM frequency of 6,000 Hz is a relatively low switching frequency compared with 20 kHz. For motor speeds around 3,000 RPM, the QSMO 170 with 6,000 Hz sampling frequency has good performance to limit a rotor position error within 3 electric degrees. However, for a much wider speed operation range, e.g., 5,000 RPM, and heavy load conditions, the sampling frequency is incremented.

Although the PWM frequency may be limited, high sampling frequency or control loop rate can be achieved by increasing the execution rate of the QSMO 170 and controller 102. For example, doubling the execution rate per PWM cycle improves the performance of the QSMO 170 while maintaining the same level of switching losses. FIG. 3 illustrates a method of estimating a rotor position in a motor according to an example embodiment. More specifically, FIG. 3 illustrates a method of estimating a rotor position in a motor. The method includes obtaining a measured current for the motor, determining an estimated current using a sliding mode observer, determining a difference between the measured current and the estimated current, generating a switching control vector based on the difference and adaptive parameters of the sliding mode observer, and estimating the rotor position based on the switching control vector.

The method of FIG. 3 may be in implemented in a sensorless drive system such as the drive system 100, shown in FIG. 1.

At S310, the drive system generates a measured current. For example, with reference to FIG. 1, the current transducers 180a, 180b measure current data ia and ib, respectively, applied to the motor 155.

The converter 160 may apply a Clarke transformation or other conversion equations (e.g., certain conversion equations that are suitable are known to those of ordinary skill in the art) to convert the measured three-phase representations of current into two-phase representations of current based on the three-phase current data ia and ib from the current transducers 180a, 180b and an estimated rotor position $\hat{\theta}_{re}$ from the QSMO 170. The output of the converter 160 module ($i_{sd}$, $i_{sq}$) is coupled to the current regulator 135.

The converter 165 may apply a Park transformation or other conversion equations (e.g., certain conversion equations that are suitable are known to those of ordinary skill in the art) to convert the measured three-phase representations of current into two-phase representations of current based on the current data ia and ib from the current transducers 180a, 180b.

The QSMO 170 receives the measured currents $i_\alpha$, $i_\beta$ and the voltage commands $v^*_\alpha$ and $v^*_\beta$.

Referring back to FIG. 3, a QSMO determines an estimated current at S320. For example, in FIG. 2A, the QSMO 170a generates estimated current value $\hat{i}_{\alpha\beta}$ ($\hat{i}_\alpha$ and $\hat{i}_\beta$) based on the voltage command $v^*_{\alpha\beta}$ ($v^*_\alpha$ and $v^*_\beta$) and the switching control vector $Z_{\alpha\beta}$.

At S330, the QSMO determines a difference between the measured current and the estimated current. For example, in FIG. 2A, the comparator 207 receives the measured currents $i_\alpha$ and $i_\beta$ and the estimated current values $\hat{i}_\alpha$ and $\hat{i}_\beta$. The comparator 207 determines errors $\epsilon_\alpha$ and $\epsilon_\beta$ between the measured currents $i_\alpha$ and $i_\beta$ and the estimated currents $\hat{i}_\alpha$ and $\hat{i}_\beta$, respectively. The errors $\epsilon_\alpha$ and $\epsilon_\beta$ may be differences between the measured currents $i_\alpha$ and $i_\beta$ and the estimated currents $\hat{i}_\alpha$ and $\hat{i}_\beta$, respectively.

At S340, the QSMO generates a switching control vector based on the difference and adaptive parameters of the QSMO. For example, The switching block 210 implements a variable switching function where $Z_0$ is an adaptive parameter.

FIG. 2B illustrates an example embodiment of the variable switching function implemented by the switching block 21. As shown in FIG. 2B, if the tracking error $\epsilon[k]$ is larger than $Z_0$, the switching block 210 outputs $Z_0$ as the switching control vector $Z_{\alpha\beta}$, and if the tracking error $\epsilon[k]$ is smaller than $-Z_0$, the switching block 210 outputs $-Z_0$ as the switching control vector $Z_{\alpha\beta}$. If the tracking error $\epsilon[k]$ is limited in a boundary layer between $-Z_0$ and $Z_0$, the output of saturation function will be the tracking error $\epsilon[k]$ as the switching control vector $Z_{\alpha\beta}$. The switching block 210 outputs the switching control vector $Z_{\alpha\beta}$ to the sliding mode current estimator 205 and the low-pass filter 215.

Moreover, condition (i) provides a lower boundary for the product of the gain l and the adaptive parameter $Z_0$; while condition (ii) provides an upper boundary for the product of the gain l and the adaptive parameter $Z_0$.

Back to FIG. 3, the QSMO estimates the rotor position based on the switching control vector at S350. For example, as shown in FIG. 2A, the position calculator 220 determines a rotor position of the motor 155 based on the estimated back EMF $\hat{e}_{\alpha\beta}$. The rotor position determined by the position calculator 220 is not compensated for the phase shift caused by the low-pass filter 215. Therefore, the phase shift compensator 225 adds a phase shift $\Delta\theta_{re}$ to the rotor position at the logic unit 227 to compensate for the phase shift. The sum of the output from the position calculator 220 and the phase shift $\Delta\theta_{re}$ is the estimated rotor position $\hat{\theta}_{re}$. Once the rotor position is estimated, the controller (e.g., 102) may control the motor based on the estimated rotor position.

Speed Aided Stabilizers

In FIG. 1A, a loop from the current regulator 135 to the inverter 150, to the QSMO 170 and back to the current regulator 135 may be referred to an inner position feedback loop. In the inner position feedback loop, QSMO 170, the controller 102 and motor 155 are coupling with each other.

The output of the QSMO 170 is the estimated rotor position $\hat{\theta}_{re}$ without any reference value, and the estimated rotor position $\hat{\theta}_{re}$ is used by the converters 140 and 160.

As described above, the pulse width generation module 145 receives the transformed voltage commands $v^*_\alpha$ and $v^*_\beta$, which are used to generate three phase voltages/currents for the motor 155. The QSMO 170 receives the measured currents $i_\alpha$ and $i_\beta$ and voltage commands $v^*_\alpha$ and $v^*_\beta$, as input. Thus, FIG. 1A shows a high order, nonlinear, and highly coupled system including error propagation and self-exciting oscillation.

In order to improve the drive system 100 stability and help the drive system 100 go through smoothly at a load/speed transient, the inventors propose speed aided stabilizers.

The drive system 100 is configured to implement the speed aided stabilizers. The speed aided stabilizers are based on the idea that motor rotor speed changes much slower than the position changes in medium and high speed ranges. Thus, during the time interval of each two sampling points, speed can be assumed as a constant value, and can be used to predict the position for a next sample. This predicted position for a next sample can be used as a reference to adjust the estimated position, so as to help the drive system 100 go through the transient with high accuracy.

Figure 4A:
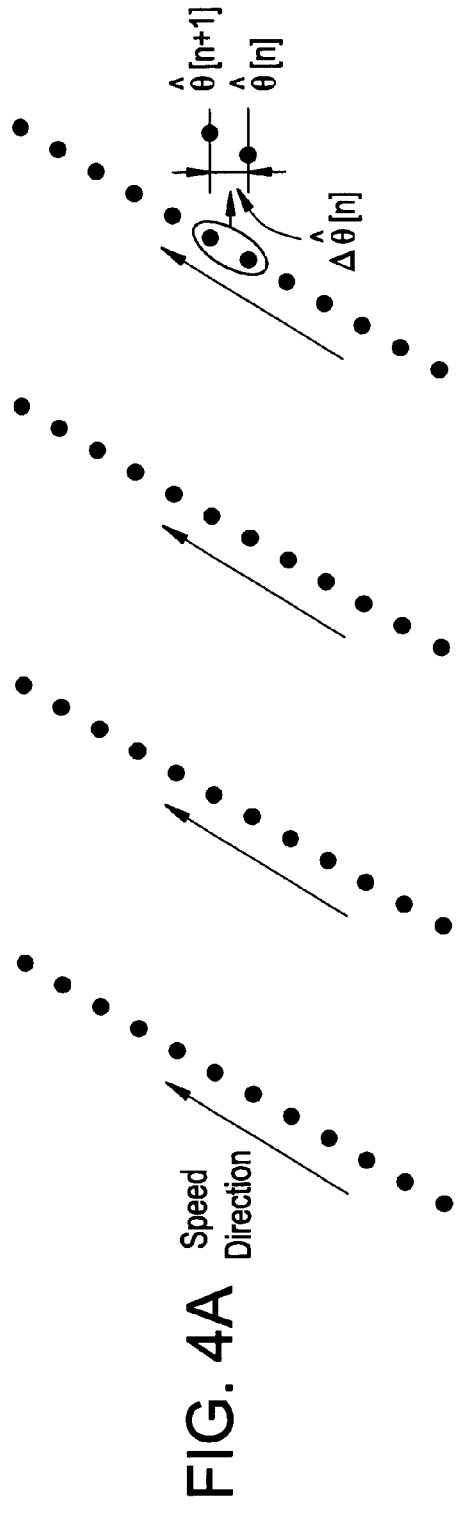
FIGS. 4A-4D illustrate an implementation of a speed buffer for a speed aided stabilizer, according to an example embodiment.
Figure 4B:
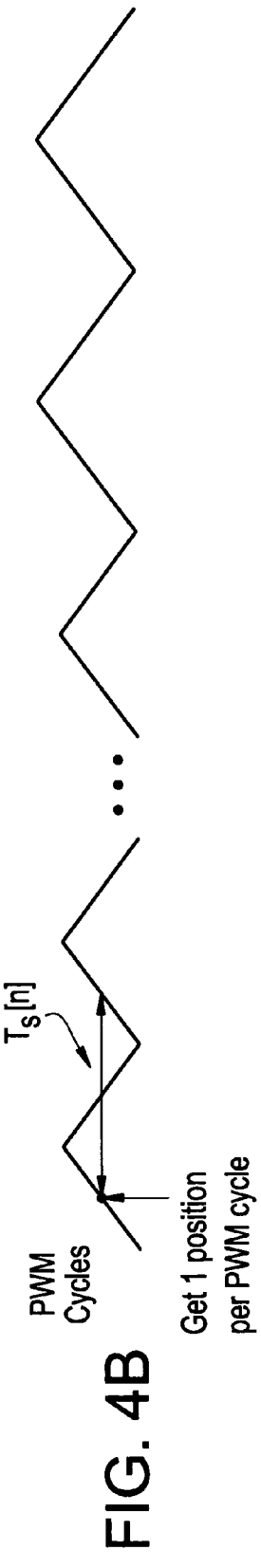
Figure 4C:
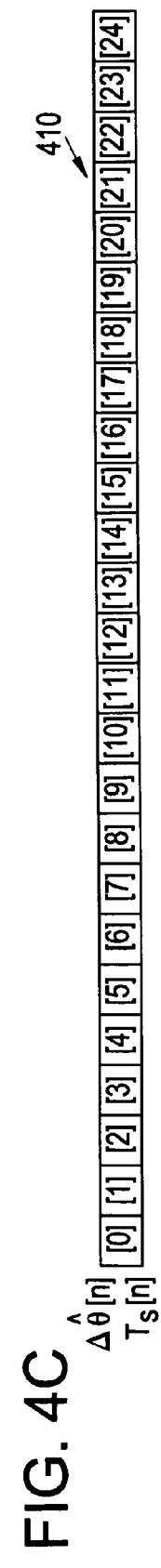
Figure 4D:
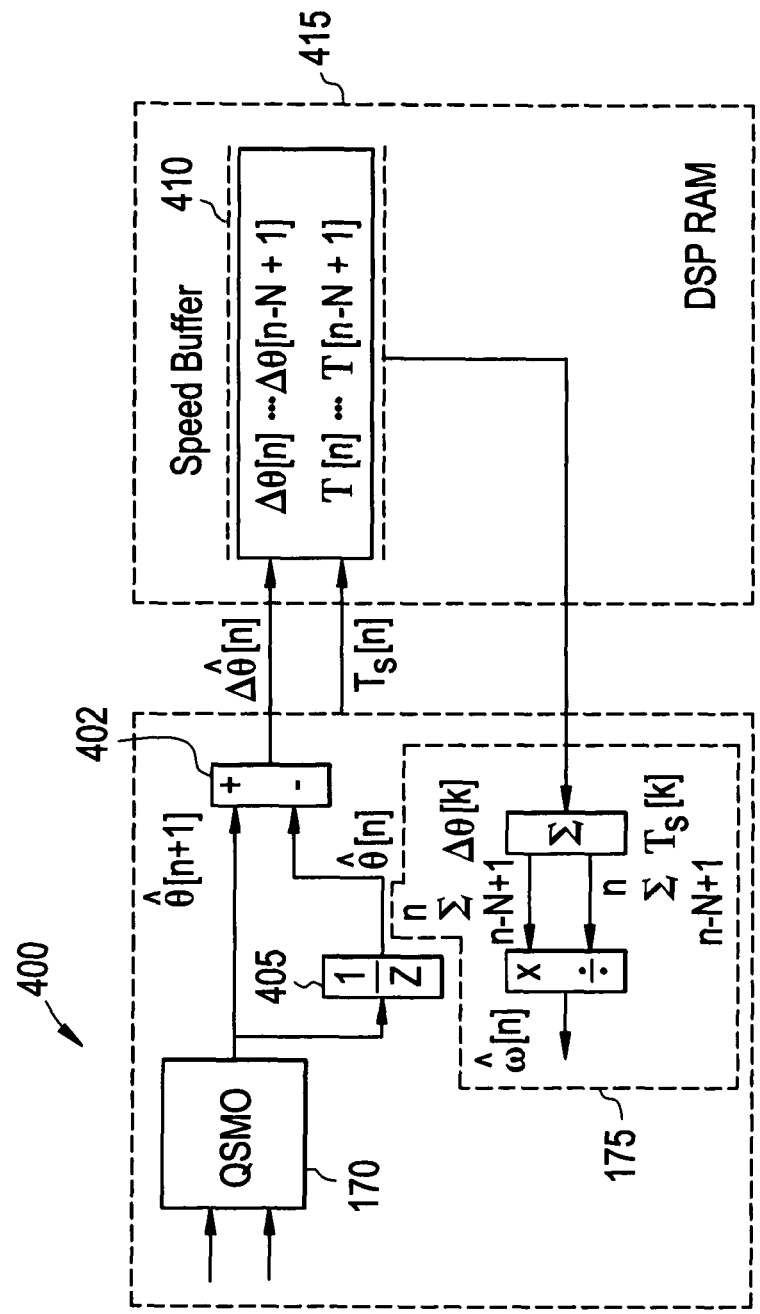

FIGS. 4A-4C illustrate an implementation of a speed buffer for a speed aided stabilizer, according to an example embodiment. FIG. 4D illustrates a structure of the speed buffer implemented in DSP RAM.

In FIGS. 4A and 4B, the QSMO 170 determines an estimated rotor position $\hat{\theta}[n]$ for every PWM cycle having a period of $T_s[n]$. As shown in FIG. 4D, a controller 400 is shown. The controller 400 is the same as the controller 102 except the controller 400 includes a comparator 402 and a delay 405. While the comparator 402 and the delay 405 are illustrated as outside of the QSMO 170, it should be understood that the comparator 402 and the delay 405 may be implemented as a part of the QSMO 170.

The QSMO 170 supplies the estimated rotor position to the comparator 402 and the delay 405. The delay 405 delays the estimated rotor position $\hat{\theta}[n]$ and outputs the delayed rotor position to the comparator 402, which is the estimated rotor position in the previous sample. Thus, the comparator 402 determines a difference $\Delta\hat{\theta}[n]$ between a current estimated rotor position $\hat{\theta}[n]$ and a subsequent estimated rotor position $\hat{\theta}[n+1]$. The difference $\Delta\hat{\theta}[n]$ represents a position change.

The comparator 402 and the delay 405 may be software used executed by a digital signal processor or microcontroller. For example, the comparator 402 and the delay 405 may be software executed by the data processor 264.

The difference $\Delta\hat{\theta}[n]$ and associated time period $T_s[n]$ are sent to and stored in a speed buffer 410. As shown, the speed buffer 410 may be stored in DSP RAM 415 or any other known type of tangible computer readable medium that is configured to be executed by a digital signal processor or microcontroller, for example.

FIG. 4C illustrates the speed buffer 410 in more detail. As shown, the speed buffer stores the difference $\Delta\hat{\theta}[n]$ and associated time period $T_s[n]$ and indexes the values according to n.

The buffer 410 is a rolling buffer, which means if a new position change $\Delta\hat{\theta}[n]$ is obtained, it will stored at buffer[0], and original buffer[0]~buffer[N-2] will be shift right, and become stored at buffer[1]~buffer[N-1]. Previous information stored in buffer [N-1] will be lost. N is the buffer size. The buffer size N may be determined based on the speed response, for example. If the size of the buffer 410 is small, the speed response will be fast, however, the estimated speed normally has larger oscillation. If the buffer size is large, the speed will be filtered smoothly, however, the speed response will be slower.

As shown in FIG. 4D, an output of the speed buffer 410 becomes similar to a moving average. More specifically, for each PWM cycle, the speed calculator 175 divides a sum of the differences stored in the speed buffer by a sum of the time periods. The speed calculator 175 outputs the divided result as an estimated speed $\hat{\omega}[n]$. In more detail, an estimated speed $\hat{\omega}[n]$ based on estimated position $\hat{\theta}[n]$ can be expressed as:

$$\omega[n] = \frac{\sum_{n-N+1}^{n} \Delta\theta[k]}{\sum_{n-N+1}^{n} T_s[k]} \qquad (37)$$

When the controller 400 implements equation (37), the speed error between estimated and measured speed may be smaller than 1%.

Figure 5:
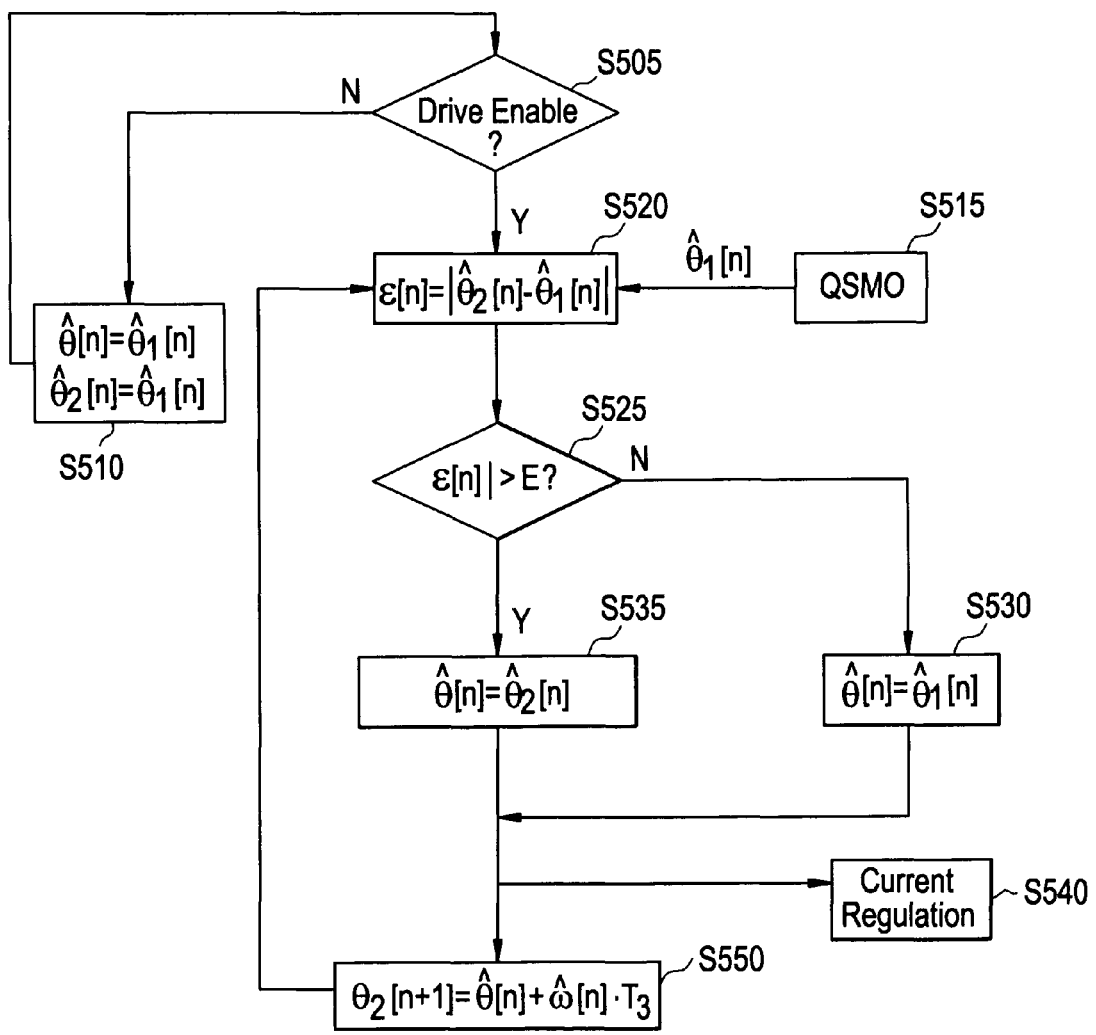
Figure 6:
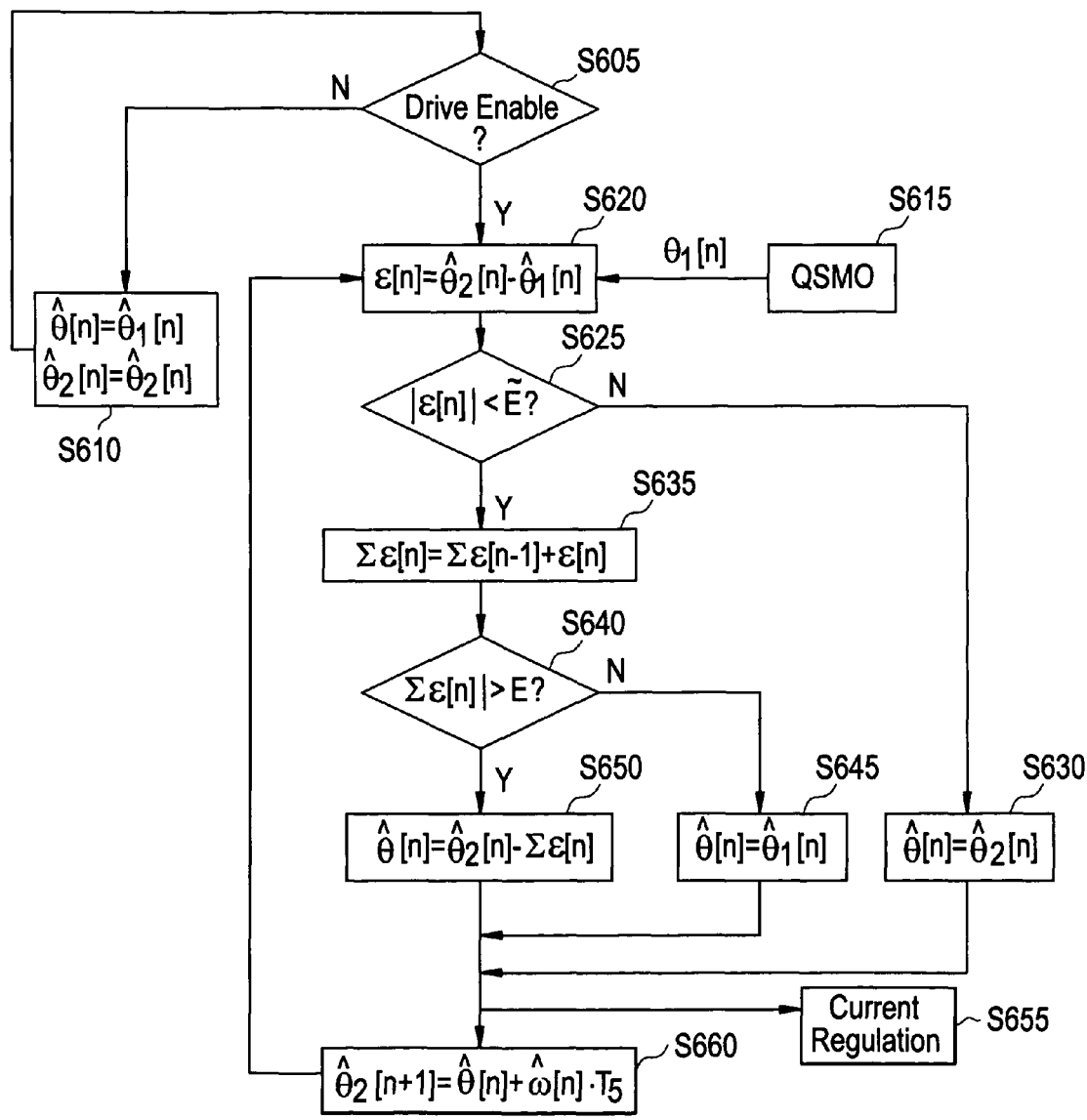

FIGS. 5 and 6 illustrate methods of estimating a position of a rotor in a motor. The methods include determining a first estimated position of the rotor using a first algorithm, determining a second estimated position of the rotor using a second algorithm, the second algorithm being different than the first algorithm, determining a first error based on the first estimated position and the second estimated position and determining a third estimated position of the rotor based on the first error.

It should be understood that the QSMO 170 in the data processing system 101 of the drive system 100 is configured to implement the methods shown in FIGS. 5-6. Therefore, the drive system 100 includes a controller configured to, determine a first estimated position of the rotor using a first algorithm, determine a second estimated position of the rotor using a second algorithm, the second algorithm being different than the first algorithm, determine a first error based on the first estimated position and the second estimated position, and determine a third estimated position of the rotor based on the first error.

First Stabilizer

FIG. 5 illustrates a first method of stabilizing speed according to an example embodiment.

At S505, the speed stabilizer determines if drive is enabled. If drive is not enabled, the speed stabilizer sets a selected position (third estimated position) $\hat{\theta}[n]$ and a second estimated position $\hat{\theta}_2[n]$ to equal a first estimated position $\hat{\theta}_1[n]$. The first estimated position $\hat{\theta}_1[n]$ is the estimated rotor position output from the QSMO 170. The speed stabilizer returns to S505 to monitor if drive is enabled.

If drive is enabled at S505, the QSMO 170 supplies the first estimated position $\hat{\theta}_1[n]$ at S515 and the speed stabilizer determines a first error $\epsilon[n]$ at S520. The speed stabilizer determines the first error $\epsilon[n]$ by determining an absolute value of a difference between the second estimated position $\hat{\theta}_2[n]$ and the first estimated position $\hat{\theta}_1[n]$.

At S525, the speed stabilizer determines if the position error is smaller than the error margin E. The error margin E indicates whether the QSMO 170 is stable. If the speed stabilizer determines that the first error $\epsilon[n]$ is less than the error margin E, then the speed stabilizer sets the selected estimated position $\hat{\theta}[n]$ as the output of the QSMO $\hat{\theta}_1[n]$, at S530. If the first error $\epsilon[n]$ is larger than the error margin E, which means QSMO 170 is unstable or large transient occurs, then the speed stabilizer sets the selected estimated position $\hat{\theta}[n]$ as second estimated position $\hat{\theta}_2[n]$, at S535.

At S540, the controller controls the motor based on the selected estimated position $\hat{\theta}[n]$.

At S550, the speed stabilizer determines a second estimated position $\hat{\theta}_2[n]$ for a next PWM cycle based on a speed prediction algorithm. The second estimated position $\hat{\theta}_2[n]$ may be determined by the speed stabilizer as:

$$\theta_2[\hat{n}+1] = \hat{\theta}[n] + \hat{\omega}[n] \times T_s \qquad (38)$$

The error margin E is a design parameter that is determined based on empirical data.

Second Stabilizer

FIG. 6 illustrates a second method of stabilizing speed according to an example embodiment. It should be understood that the QSMO 170 is configured to implement the method shown in FIG. 6.

In the method of FIG. 6, the speed stabilizer implements a position error rolling sum $\Sigma\epsilon[n]$. The position error rolling sum $\Sigma\epsilon[n]$ adds each sample error $\epsilon[n]$ between $\hat{\theta}_2[n]$ and $\hat{\theta}_1[n]$ together.

In the method of FIG. 6, the position error rolling sum $\Sigma\epsilon[n]$ may be referred to as the first error.

At S605, the speed stabilizer determines if drive is enabled. If drive is not enabled, the speed stabilizer sets a selected position (third estimated position) $\hat{\theta}[n]$ and the second estimated position $\hat{\theta}_2[n]$ equal the first estimated position $\hat{\theta}_1[n]$. The first estimated position $\hat{\theta}_1[n]$ is the estimated rotor position output from the QSMO 170. The speed stabilizer returns to S605 to monitor if drive is enabled.

If drive is enabled at S605, the QSMO 170 supplies the first estimated position $\hat{\theta}_1[n]$ at S615 and the speed stabilizer determines a current error $\epsilon[n]$ at S620. The speed stabilizer determines the current error $\epsilon[n]$ by determining an absolute value of a difference between the second estimated position $\hat{\theta}_2[n]$ and the first estimated position $\hat{\theta}_1[n]$.

At S625, the speed stabilizer determines if the current error $\epsilon[n]$ is smaller than an error margin for a single sample $\tilde{E}$. The error margin $\tilde{E}$ indicates whether the QSMO 170 is stable. If the speed stabilizer determines that the current error $\epsilon[n]$ is larger than the error margin for a single sample $\tilde{E}$, then the speed stabilizer sets the selected the second estimated position $\hat{\theta}_2[n]$, at S630.

If the current error $\epsilon[n]$ is less than error margin for a single sample $\tilde{E}$, then the speed stabilizer adds the current error $\epsilon[n]$ to a sum of previous errors $\Sigma\epsilon[n-1]$ to determine the position error rolling sum $\Sigma\epsilon[n]$, at S635.

At S640, the speed stabilizer determines if the position error rolling sum $\Sigma\epsilon[n]$ is smaller than the error margin E. The error margin E indicates whether the QSMO 170 is stable. If the speed stabilizer determines that the position error rolling sum $\Sigma\epsilon[n]$ is less than the error margin E, then the speed stabilizer sets the selected estimated position $\hat{\theta}[n]$ as the output of the QSMO $\hat{\theta}_1[n]$, at S645. If position error rolling sum $\Sigma\epsilon[n]$ is larger than the error margin E, which means QSMO 170 is unstable or large transient occurs, then the speed stabilizer sets the selected estimated position $\hat{\theta}[n]$ as second estimated position $\hat{\theta}_2[n]$ minus the position error rolling sum $\Sigma\epsilon[n]$, at S650.

At S655, the controller controls the motor based on the selected estimated position $\hat{\theta}[n]$.

At S660, the speed stabilizer determines a second estimated position $\hat{\theta}_2[n]$ for a next PWM cycle based on a speed prediction algorithm. The step S660 is the same as S550 and, thus, will not be described in greater detail for the sake of clarity.

The error margin for a single sample $\tilde{E}$ is a small value, and normally generally within 0.5 electric degree. Moreover, the error margin E may be selected as 3 electric degrees.

As described above, the inventors have discovered an adaptive Quasi-SMO (QSMO) to estimate the rotor position from the extended back electromagnetic force (EMF) quantities in an IPMSM. The QSMO parameters are adaptive to the load and rotor speed.

At least one example embodiment discloses an extended back EMF-based adaptive QSMO for rotor position estimation for a sensorless IPMSM drive. The inventors have discovered that a discrete-time sliding mode observer (DSMO) with conventional switching functions, e.g., a sign function, will keep tight regulation to force the state trajectory close to the sliding surface even when tracking error is within the width of the boundary layer. This could cause a chattering problem during steady state. To mitigate this chattering problem, and to reach a global stability as well as a bounded motion within a limited boundary layer, a switching function may be implemented. The switching function leads to a quasi-sliding mode motion of the DSMO at steady state. Since the magnitude of the extended back EMF of the IPMSM changes with both load and speed variations, the parameters allow better performance than conventional SMOs.

At least another example embodiment discloses speed aided stabilizers to improve the drive system stability and help the drive system go through smoothly at load/speed transients. The speed aided stabilizers are based on the idea that motor rotor speed changes much slower than the position changes in medium and high speed ranges. Thus, during the time interval of each two sampling points, speed can be assumed as a constant value, and can be used to predict the position for a next sample. This predicted position for a next sample can be used as a reference to adjust the estimated position, so as to help the system go through the transient with high accuracy.

Example embodiments being thus described, it will be obvious that the same may be varied in many ways. Such variations are not to be regarded as a departure from the spirit and scope of example embodiments, and all such modifications as would be obvious to one skilled in the art are intended to be included within the scope of the claims.

What is claimed is:

1. A drive system comprising: a motor including a rotor, the motor configured to receive a measured current; a controller configured to generate a voltage command for the motor; a sliding mode observer configured to determine an estimated current for the motor based on the voltage command, determine a difference between the measured current and the estimated current, and determine a switching control vector; and an estimator configured to estimate a rotor position based on the switching control vector, the switching control vector being defined as a switching function with its outputs comprising the difference and adaptive parameters of the sliding mode observer, the controller being further configured to control the motor based at least in part on the estimated rotor position.

2. The drive system of claim 1, wherein the sliding mode observer is configured to sample the measured current at a frequency of less than 10 kHz.

3. The drive system of claim 2, wherein the sliding mode observer is configured to sample the measured current at approximately 6 kHz.

4. The drive system of claim 2, wherein the sliding mode observer comprises the estimator.

5. The drive system of claim 1, wherein the controller is configured to drive the motor between 500 revolutions per minute (RPM) and 5000 RPM.

6. The drive system of claim 1, wherein the sliding mode observer is configured to determine the switching control vector by $$Z_{\alpha\beta} = \begin{cases} Z_0 & \varepsilon[k] > Z_0 \\ \varepsilon[k] & -Z_0 < \varepsilon[k] < Z_0 \\ -Z_0 & \varepsilon[k] < -Z_0 \end{cases}$$

wherein $Z_{\alpha\beta}$ is the switching control vector, $\varepsilon[k]$ is the difference and $Z_0$ is one of the adaptive parameters.

7. The drive system of claim 6, wherein $Z_0$ is $$Z_0 > \frac{2|\eta|}{2L_d f_s - R}$$

wherein $L_d$ is a direct axis inductance of the motor, $f_s$ is a sampling frequency, $\eta$ is a magnitude of extended back electromagnetic force (EMF) of the motor and R is a resistance of a stator of the motor.

8. The drive system of claim 7, wherein $$Z_0 = \alpha \frac{2|\eta|}{2L_d f_s - R}$$

wherein $\alpha$ is between 1.1 and 1.2.

9. The drive system of claim 6, wherein the sliding mode observer is configured to receive a command speed for the motor and an associated torque percentage and the sliding mode observer includes,
a three-dimensional lookup table configured to determine $Z_0$ based on the command speed and the torque percentage.

10. The drive system of claim 6, wherein the sliding mode observer is configured to determine an extended back electromagnetic force (EMF) of the motor and $Z_0$ is proportional to a magnitude of the extended back EMF of the motor.

11. The drive system of claim 10, wherein the sliding mode observer is configured to produce a gain and a product of the gain and $Z_0$ is larger than the magnitude of the extended back EMF of the motor.

12. The drive system of claim 1, further comprising:
an inverter configured to supply a three-phase current to the motor based on pulse width modulation (PWM).

13. The drive system of claim 12, wherein the sliding mode observer is configured to estimate a rotor position at a sampling frequency relatively greater than a PWM frequency.

14. The drive system of claim 12, wherein the sliding mode observer is configured to estimate a rotor position at a sampling frequency double a PWM frequency.

15. The drive system of claim 1, wherein the controller is configured to generate a voltage command and the sliding mode observer is configured to determine the estimated current based on the voltage command and the current command.

16. A method of estimating a rotor position in a motor, the method comprising: obtaining a measured current for the motor; determining an estimated current using a sliding mode observer; determining a difference between the measured current and the estimated current; generating a switching control vector defined as a switching function with its outputs comprising the difference and adaptive parameters of the sliding mode observer; and estimating the rotor position based on the switching control vector.

17. The method of claim 16, further comprising:
sampling the measured current a frequency of less than 10 kHz, wherein the determining of a difference determines the difference based on the sampled measured current.

18. The method of claim 17, wherein the sampling samples the measured current at approximately 6 kHz.

19. The method of claim 17, further comprising:
driving the motor between 500 revolutions per minute (RPM) and 5000 RPM.

20. The method of claim 16, further comprising:
driving the motor between 500 revolutions per minute (RPM) and 5000 RPM.

21. A sliding mode observer configured to, receive a measured current for a motor, determine an estimated current for a motor, determine a difference between the measured current and the estimated current, determine a switching control vector, and estimate a rotor position based on the switching control vector, the switching control vector being defined as a switching function with its outputs comprising the difference and adaptive parameters of the sliding mode observer.

22. A method of estimating a rotor position in a motor in a sensorless drive system, the method comprising: generating a measured current for the motor;

determining an estimated current using a sliding mode observer; determining a difference between the measured current and the estimated current; generating a switching control vector defined as a switching function with its outputs comprising the difference and adaptive parameters of the sliding mode observer; estimating the rotor position based on the switching control vector; and controlling the motor based on the estimating.

\* \* \* \* \*